United States Patent
Pazhayampallil et al.

(10) Patent No.: US 11,719,821 B2
(45) Date of Patent: Aug. 8, 2023

(54) METHOD FOR OBJECT AVOIDANCE DURING AUTONOMOUS NAVIGATION

(71) Applicant: BlueSpace.ai, Inc., Santa Clara, CA (US)

(72) Inventors: Joel Pazhayampallil, Santa Clara, CA (US); Christine Moon, Santa Clara, CA (US)

(73) Assignee: BlueSpace.ai, Inc., Santa Clara, CA (US)

( * ) Notice: Subject to any disclaimer, the term of this patent is extended or adjusted under 35 U.S.C. 154(b) by 192 days.

(21) Appl. No.: 17/182,173

(22) Filed: Feb. 22, 2021

(65) Prior Publication Data

US 2021/0261159 A1 Aug. 26, 2021

Related U.S. Application Data

(60) Provisional application No. 63/064,316, filed on Aug. 11, 2020, provisional application No. 62/980,131, (Continued)

(51) Int. Cl.
*B60W 60/00* (2020.01)
*B60W 30/095* (2012.01)
(Continued)

(52) U.S. Cl.
CPC ............ *G01S 17/89* (2013.01); *B60W 10/18* (2013.01); *B60W 30/0956* (2013.01);
(Continued)

(58) Field of Classification Search
CPC ........ G01S 17/89; G01S 17/58; G01S 17/931; B60W 10/18; B60W 30/0956;
(Continued)

(56) References Cited

U.S. PATENT DOCUMENTS 9,903,728 B2 2/2018 Powers et al.
2007/0288133 A1 12/2007 Nishira et al.
(Continued)

FOREIGN PATENT DOCUMENTS

WO 2020035728 A2 2/2020

OTHER PUBLICATIONS

International Search Report and Written Opinion for International Patent Application No. PCT/US2021/19122, dated Sep. 14, 2021, Entire Document.
(Continued)

*Primary Examiner* — Brian P Sweeney
(74) *Attorney, Agent, or Firm* — Run8 Patent Group, LLLC; Peter Miller

(57) ABSTRACT

A method for autonomous navigation of an autonomous vehicle includes: accessing a first scan image containing data captured by a sensor on the autonomous vehicle at a first time; identifying a first group of points in the first scan image representing an object in a field proximal the autonomous vehicle; characterizing a first motion of the object at the first time based on the first group of points; characterizing an uncertainty of the first motion of the object at the first time; calculating a predicted second uncertainty of a second motion of the object at a second time based on the first motion of the object and motion of the autonomous vehicle at the first time; and, in response to the predicted second uncertainty falling below the uncertainty, muting the object from braking consideration for object avoidance by the autonomous vehicle at the second time.

20 Claims, 9 Drawing Sheets

Related U.S. Application Data filed on Feb. 21, 2020, provisional application No. 62/980,132, filed on Feb. 21, 2020.

(51) Int. Cl.

| | | |
|---|---|---|
| *B60W 30/18* | (2012.01) | |
| *B60W 30/14* | (2006.01) | |
| *B60W 40/105* | (2012.01) | |
| *B60W 10/18* | (2012.01) | |
| *G01S 17/58* | (2006.01) | |
| *G01S 17/89* | (2020.01) | |
| *G01S 17/931* | (2020.01) | |
| *G06K 9/00* | (2022.01) | |
| *B60W 40/068* | (2012.01) | |
| *G06V 20/58* | (2022.01) | |
| *G06V 10/25* | (2022.01) | |
| *G06V 20/64* | (2022.01) | |

(52) U.S. Cl.
CPC ........ *B60W 30/146* (2013.01); *B60W 30/181* (2013.01); *B60W 40/068* (2013.01); *B60W 40/105* (2013.01); *B60W 60/0011* (2020.02); *G01S 17/58* (2013.01); *G01S 17/931* (2020.01); *G06V 10/25* (2022.01); *G06V 20/58* (2022.01); *G06V 20/64* (2022.01); *B60W 2420/52* (2013.01); *B60W 2552/40* (2020.02); *B60W 2554/4041* (2020.02); *B60W 2554/80* (2020.02)

(58) Field of Classification Search
CPC ............. B60W 30/146; B60W 30/181; B60W 40/068; B60W 40/105; B60W 60/0011; B60W 2420/52; B60W 2552/40; B60W 2554/4041; B60W 2554/80; B60W 30/09; B60W 2554/4042; B60W 2554/4043; G06V 10/25; G06V 20/58; G06V 20/64; G06V 2201/12; B60Y 2300/0954
See application file for complete search history.

(56) References Cited

U.S. PATENT DOCUMENTS

| | | |
|---|---|---|
| 2010/0295940 A1 | 11/2010 | Schwarte |
| 2016/0171898 A1 | 6/2016 | Silver |
| 2016/0291149 A1* | 10/2016 | Zeng ................ G01S 13/874 |
| 2019/0049968 A1* | 2/2019 | Dean .................... A61G 5/04 |
| 2019/0219700 A1 | 7/2019 | Coombe et al. |
| 2019/0340445 A1 | 11/2019 | Chowdhury et al. |
| 2019/0346561 A1 | 11/2019 | Hofmann |
| 2019/0361106 A1 | 11/2019 | Stachnik et al. |
| 2020/0027230 A1 | 1/2020 | Zhao et al. |
| 2020/0211394 A1 | 7/2020 | King et al. |
| 2020/0250837 A1 | 8/2020 | Fagg et al. |

OTHER PUBLICATIONS

Australian Examination Report received in Australian Patent Application No. 2021222055 dated Oct. 25, 2022.
Non-Final Office Action for U.S. Appl. No. 17/182,165 dated May 19, 2021.
Notice of Allowance received in U.S. Appl. No. 17/182,165 dated Sep. 13, 2021.

* cited by examiner

S100

Vector to mean of object points:

$$\vec{r} = [x\ y\ z]$$

Unit vector in radial direction:

$$\hat{r} = \frac{\vec{r}}{\|\vec{r}\|}$$

Unit vector orthogonal to r, e.g. in azimuth direction:

$$\hat{t} = \{t \in R^3 : \|\hat{t}\| = 1, \hat{r} \perp \hat{t}\}$$

Unit vector orthogonal to r and t, e.g. in elevation direction:

$$\hat{e} = \hat{r} \times \hat{t}$$

Matrix that defines a basis for $R^3$ with basis vectors aligned with the measurement directions:

$$D = \begin{bmatrix} \hat{r} \\ \hat{t} \\ \hat{e} \end{bmatrix}$$

skew symmetric matrix that defines the cross product with $\vec{r}$:

$$[\vec{r}]_x = \begin{bmatrix} 0 & -z & y \\ z & 0 & -x \\ -y & x & 0 \end{bmatrix}$$

Matrix representing the linear relationships between the linear and angular velocities:

$$H = [D\ \ D[\vec{r}]_x]$$

Measurement generated from the mean radial velocity, the slope of radial velocities in the azimuth direction, and slope of radial velocities in the elevation direction:

$$\vec{z} = [v_{radial}\ S_{az}\ S_{el}]^T$$

The 6DoF state space of object motions, e.g. 3 linear velocities and 3 angular velocities:

S122
$$\vec{v} = [v_x\ v_y\ v_z]$$
$$\vec{w} = [w_x\ w_y\ w_z]$$
$$\vec{s} = [\vec{v}\ \vec{w}]^T$$

The final equation relating the measurements and motion state of the object:

$$\vec{z} = H\vec{s}$$

*FIG. 7*

METHOD FOR OBJECT AVOIDANCE DURING AUTONOMOUS NAVIGATION

CROSS-REFERENCE TO RELATED APPLICATIONS

This application claims priority to U.S. Provisional Patent Application Nos. 62/980,131, filed on 21 Feb. 2020, 62/980,132, filed on 21 Feb. 2020, and 63/064,316, filed on 11 Aug. 2020, each of which is incorporated in its entirety by this reference.

TECHNICAL FIELD

This invention relates generally to the field of autonomous vehicles and more specifically to a new and useful method for object avoidance during autonomous navigation in the field of autonomous vehicles.

BRIEF DESCRIPTION OF THE FIGURES

FIG. 7 is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
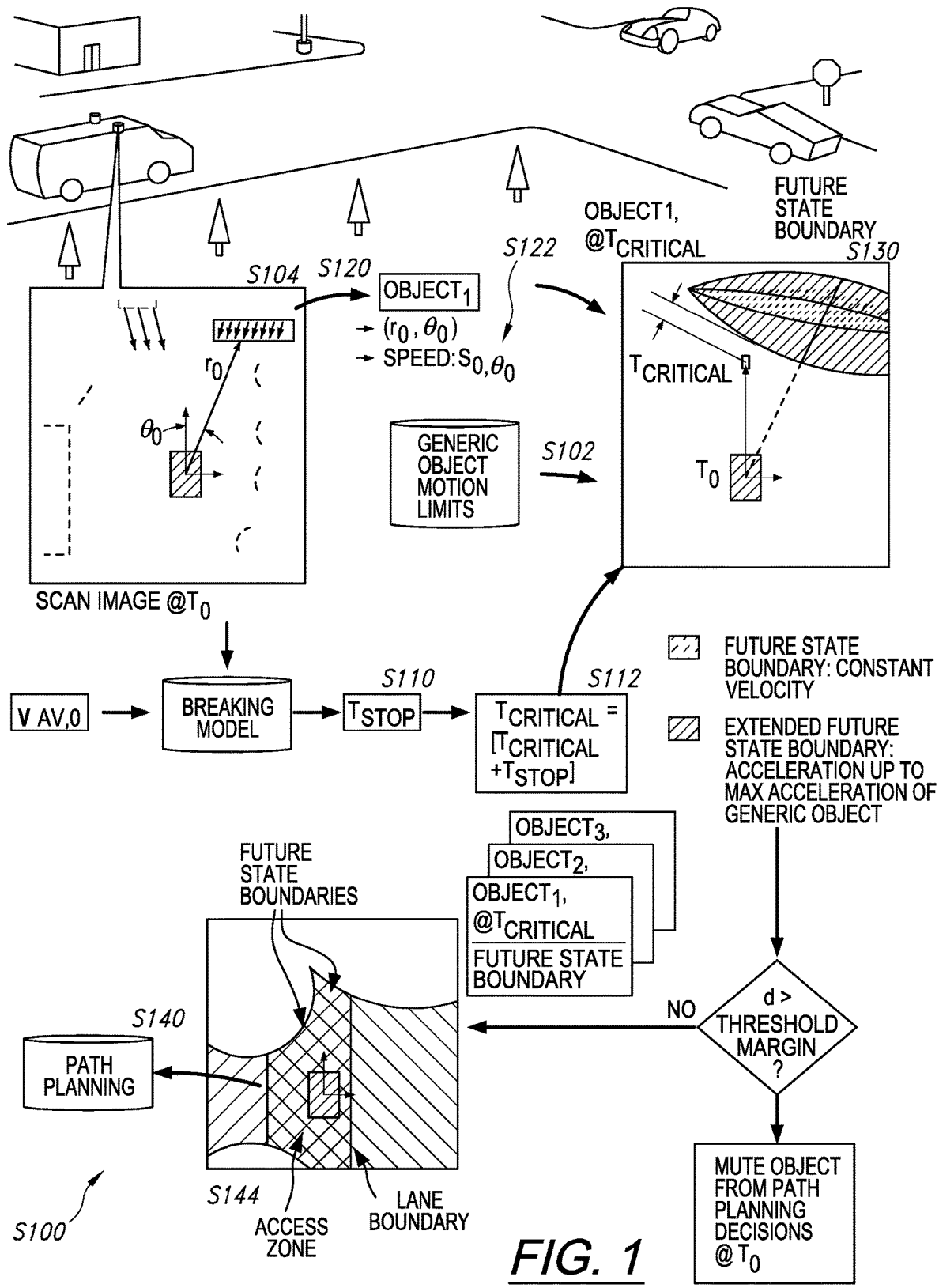
FIG. 1 is a flowchart representation of a method.

As shown in FIG. 1, a method S100 for object avoidance during autonomous navigation includes: at a first time at an autonomous vehicle, estimating a stopping duration, for the autonomous vehicle to reach a full stop, based on a speed of the autonomous vehicle at the first time in Block S110; storing a critical time offset from the first time by the stopping duration in Block S112; detecting an object in a first scan image of the field around the autonomous vehicle captured at approximately the first time in Block S120; and, based on the first scan image, deriving a first location and a first radial speed of the object along a first ray from the autonomous vehicle to the object in Block S122. The method S100 also includes calculating a first future state boundary that represents a ground area accessible to the object from the first time to the critical time in Block S130 based on: the first location of the object at the first time; the first radial speed of the object; and a maximum assumed angular velocity, and a maximum assumed acceleration of a generic object defined for operation of the autonomous vehicle. The method S100 further includes, in response to a first distance between the autonomous vehicle at the first time and a perimeter of the future state boundary exceeding a threshold distance, muting the object from a next path planning consideration at the autonomous vehicle in Block S142; and, in response to the threshold distance exceeding the first distance, calculating an access zone, around the autonomous vehicle, excluding the future state boundary of the object in Block S144 and executing a navigational action to remain in the access zone from the first time to the critical time in Block S140.

One variation of the method S100 includes: at a first time at the autonomous vehicle, estimating a stopping duration, for the autonomous vehicle to reach a full stop, based on a speed of the autonomous vehicle at the first time in Block S110; calculating a critical time offset from the first time by the stopping duration in Block S112; detecting an object in a first scan image, of a field proximal the autonomous vehicle, captured by a sensor on the autonomous vehicle at approximately the first time in Block S120; based on the first scan image, deriving a first location and a first motion of the first object in Block S122; calculating a first future state boundary that represents a first ground area accessible to the first object from the first time to the first critical time in Block S130 based on the first location of the first object at the first time, the first motion of the first object and a set of predefined motion limit assumptions for generic objects proximal public roads; and electing a first navigational action to avoid entry into the first future state boundary prior to the first critical time in Block S140.

Another variation of the method S100 includes: accessing a set of predefined motion limit assumptions for generic objects proximal public roads in Block S102; accessing a scan image containing data captured by a sensor on the autonomous vehicle at a first time in Block S104; identifying a group of points in the scan image representing an object in a field proximal the autonomous vehicle in Block S120, each point in the group of points including a position of a surface on the object relative to the autonomous vehicle and a radial velocity of the surface of the object relative to the autonomous vehicle; calculating a correlation between radial velocities and positions of points in the group of points in Block S122; based on the correlation, calculating a function that relates possible tangential velocities of the object and possible angular velocities of the object at the first time in Block S122; calculating a radial velocity of the object at the first time based on radial velocities of points in the group of points in Block S122; calculating a future state boundary that represents a ground area accessible to the object at a future time in Block S130 based on possible tangential velocities of the object and possible angular velocities of the object—at the first time—defined by the function, the radial velocity of the object, and the set of predefined motion limit assumptions; and electing a navigational action to avoid the future state boundary prior to the future critical time in Block S140.

Yet another variation of the method S100 includes accessing a set of predefined motion limit assumptions for generic objects proximal public roads in Block S102. The variation of the method S100 also includes, for a first scan cycle: accessing a first scan image containing data captured by a sensor on the autonomous vehicle at a first time in Block S104; identifying a first group of points in the first scan image representing a first object in a field proximal the autonomous vehicle in Block S120, each point in the first group of points including a first range value from the sensor to a surface on the first object, a first azimuthal position of the surface on the first object relative to the sensor and a first radial velocity of the surface of the first object relative to the sensor; calculating a first correlation between first radial velocities and first azimuthal positions of points in the first group of points in Block S122; based on the first correlation, calculating a first function that relates possible tangential velocities of the first object and possible angular velocities of the first object at the first time in Block S122; and calculating a first radial velocity of the first object at the first time based on first radial velocities of points in the first group of points in Block S122. This variation of the method S100 further includes: estimating a first stopping duration, for the autonomous vehicle to reach a full stop, based on a first speed of the autonomous vehicle at the first time in Block S110; calculating a first critical time offset from the first time by the stopping duration in Block S112; calculating a first future state boundary that represents a first ground area accessible to the first object at the first critical time in Block S130 based on possible tangential velocities of the first object and possible angular velocities of the first object—at the first time—defined by the first function, the first radial velocity, and the set of predefined motion limit assumptions; and electing a first navigational action to avoid entry into the first future state boundary prior to the first critical time in Block S140.

2. Applications

Generally, the method S100 can be executed by an autonomous vehicle (e.g., an autonomous bus, an autonomous passenger vehicle) to: detect an object in its environment; assign worst-case speed and acceleration values to the object based on preloaded maximum motion assumptions of a generic object (or preloaded adversarial motion limits for a generic adversarial object); estimate a maximal ground area accessible to the object from the current time up to a time that the autonomous vehicle may brake to a full stop given its current speed; and to selectively mute the object from path planning considerations if the autonomous vehicle is sufficiently far from this maximal ground area accessible or to consider this object and execute speed and/or steering angle adjustments to avoid entry into this maximal ground area accessible in the future.

More specifically, throughout operation, the autonomous vehicle can maintain an estimate of its stopping duration over which the autonomous vehicle can reach a full stop given its current speed. When the autonomous vehicle first detects an object in its field, the autonomous vehicle can: assign predefined, worst-case speed and acceleration assumptions of an adversarial agent to this object; and calculate a maximal ground area (hereinafter a "future state boundary") that this object can access—under these worst-case speed and acceleration assumptions—over the autonomous vehicle's current stopping duration given the current location of the object. If the autonomous vehicle's current location is sufficiently offset from or otherwise outside of this future state boundary of the object, the autonomous vehicle can: predict its ability to reach a full stop well before colliding with this object even under worst-case adversarial actions of the object; and therefore ignore or mute the object from current path planning decisions and instead wait until a later time when the autonomous vehicle nears the future state boundary of the object to execute navigational actions to avoid the object. Conversely, if the autonomous vehicle's current location is near this future state boundary of the object, the autonomous vehicle can reduce its speed (e.g., by a magnitude inversely proportional to the distance from the autonomous vehicle to the perimeter of the future state boundary), thereby: reducing the autonomous vehicle's stopping duration; shrinking the future state boundary of the object (which represents a maximal ground area accessible to the object over the autonomous vehicle's current stopping duration); and enabling the autonomous vehicle to remain outside of this future state boundary of the object over time. Therefore, the autonomous vehicle can execute Blocks of the method S100 to inform navigational actions (e.g., speed and/or steering angle adjustments) predicted to maintain a spatial and temporal distance from the object in order to enable the autonomous vehicle to reach a full stop prior to collision with the object, even if the object initiates or continues an adversarial action in the direction of the autonomous vehicle immediately after the autonomous vehicle first detects the objects in its environment.

Furthermore, the autonomous vehicle can: detect and track this object over subsequent scan images; derive a real velocity of the object from these scan images (e.g., an absolute velocity of the object based on changes in position of the object over multiple consecutive scan images and successive radial speed measurements); and replace worst-case assumptions for the speed of the object with real velocity of the object. The autonomous vehicle can then repeat Blocks of the method S100 to: recalculate a future state boundary of the object based on its real velocity and worst-case acceleration assumptions for a generic object; and to selectively mute the object from current path planning considerations based on the autonomous vehicle's location relative to this revised future state boundary.

For example, the autonomous vehicle can: store worst-case speeds and accelerations of high-performance passenger vehicles or high-performance motorcycles (e.g., a maximum speed of 50 meters per second, a maximum acceleration of 9 meters per second per second); and implement these worst-case speeds and accelerations to calculate future state boundaries of all detected objects regardless of the actual types or classes of these objects. Thus, the autonomous vehicle can reduce or eliminate reliance on object identification and other machine learning techniques to identify types of objects and to distinguish immutable objects (e.g., road signs, telephone poles) from mutable objects (e.g., pedestrian, vehicles) in the field around the autonomous vehicle. More specifically, rather than predict a future state of an object based on a dynamics model selected according to a predicted type of the object, the autonomous vehicle can instead: predict and bound future states of the object based on limited motion data of the object, its current position relative to the autonomous vehicle, and maximum speed and acceleration assumptions for a generic object (e.g., a generic high-performance passenger vehicle); and refine (e.g., narrow) these future state boundaries of the object as the autonomous vehicle collects additional velocity data for this object over time.

Therefore, by executing Blocks of the method S100 to inform path planning decisions, the autonomous vehicle can: reduce or eliminate a need to accurately identify types or classes of objects in its environment; reduce or eliminate this possible source of error in autonomous operation of the autonomous vehicle; and increase robustness of autonomous operation of the autonomous vehicle, such as against adversarial computer vision attacks, adversarial neural network attacks, or in circumstances with limited or no prior training data.

Furthermore, the autonomous vehicle can implement identical detection, tracking, and motion planning decision pathways for both mutable and immutable objects, thereby reducing or eliminating a need to identify classes of objects (or classifying objects as mutable or immutable) in the autonomous vehicle's environment and reducing a quantity of unique computer vision, machine learning, and path planning pipelines executing on the autonomous vehicle. For example, the autonomous vehicle can execute identical detection, tracking, and motion planning decision pathways to predict and handle: possible undetectable objects in the autonomous vehicle's environment but obscured by other detected objects (e.g., a pedestrian standing behind a telephone pole; a passenger vehicle occupying a lane obstructed in the autonomous vehicle's field of view by a tractor trailer); objects first entering the autonomous vehicle's field of view; and objects extant in the autonomous vehicle's field of view.

3. Autonomous Vehicle

The autonomous vehicle can include: a suite of sensors configured to collect data representative of objects in the field around the autonomous vehicle; local memory that stores a navigation map defining a route for execution by the autonomous vehicle, and a localization map that represents locations of immutable surfaces along a roadway; and a controller. The controller can: calculate the location of the autonomous vehicle in real space based on sensor data collected from the suite of sensors and the localization map; calculate future state boundaries of objects detected in these sensor data according to Blocks of the method S100; elect future navigational actions based on these future state boundaries, the real location of the autonomous vehicle, and the navigation map; and control actuators within the vehicle (e.g., accelerator, brake, and steering actuators) according to these navigation decisions.

In one implementation, the autonomous vehicle includes a set of 360° LIDAR sensors arranged on the autonomous vehicle, such as one LIDAR sensor arranged at the front of the autonomous vehicle and a second LIDAR sensor arranged at the rear of the autonomous vehicle, or a cluster of LIDAR sensors arranged on the roof of the autonomous vehicle. Each LIDAR sensor can output one three-dimensional distance map (or depth image)—such as in the form of a 3D point cloud representing distances between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field.

The autonomous vehicle can additionally or alternatively include a set of color cameras facing outwardly from the front, rear, and/or sides of the autonomous vehicle. For example, each camera in this set can output a video feed of digital photographic images (or "frames") at a rate of 20 Hz. The autonomous vehicle can also include a set of RADAR sensors facing outwardly from the autonomous vehicle and configured to detect presence and speeds of objects near the autonomous vehicle. The controller in the autonomous vehicle can thus fuse data streams from the LIDAR sensor(s), the color camera(s), and the RADAR sensor(s), etc. into one scan image—such as in the form of a 3D color map or 3D point cloud containing constellations of points that represent roads, sidewalks, vehicles, pedestrians, etc. in the field around the autonomous vehicle—per scan cycle.

However, the autonomous vehicle can include any other sensors and can implement any other scanning, signal processing, and autonomous navigation techniques or models to determine its geospatial position and orientation, to perceive objects in its vicinity, and to elect navigational actions based on sensor data collected through these sensors.

3.1 Object Location+Motion Data

In one implementation, the autonomous vehicle includes a sensor that outputs a scan image containing a constellation of points, wherein each point in this scan image: represents a position of a surface in the environment relative to the sensor (or to the autonomous vehicle more generally); and specifies a speed of this surface along a ray extending from the sensor (or the autonomous vehicle more generally) to this surface.

In one example, the autonomous vehicle includes a 3D scanning LIDAR sensor configured to detect distances and relative speeds of surfaces—along rays extending from the sensor (or the autonomous vehicle more generally) to these surfaces—in the field around the autonomous vehicle. In this example, the 3D scanning LIDAR sensor can: represent a position of a surface in the field in spherical coordinates in a polar coordinate system—that defines an origin at the 3D scanning LIDAR sensor (or at a reference position on the autonomous vehicle); and store these polar coordinates in one scan image per scan cycle (e.g., per rotation) of the sensor. Therefore, in this example, the autonomous vehicle can access a scan image containing data captured by a four-dimensional light detection and ranging sensor: mounted on the autonomous vehicle; and configured to generate scan images representing positions and speeds of surfaces within the field relative to the sensor.

In this example, the autonomous vehicle can include multiple such 3D scanning LIDAR sensors, each configured to output one scan image per scan cycle. The autonomous vehicle can then fuse concurrent scan images output by these sensors into one composite scan image for this scan cycle.

Alternately, the autonomous vehicle can include a suite of sensors that capture data of different types and can fuse outputs of these sensors into a scan image containing points at locations of surfaces in the field and annotated with speeds of these surfaces along rays extending between the autonomous vehicle and these surfaces. For example, the autonomous vehicle can include a 3D scanning LIDAR sensor: that defines a LIDAR field of view; and configured to generate a 3D point cloud containing a constellation of points during a scan cycle, wherein each point defines a position of a region on a surface in the environment around the autonomous vehicle. In this example, the autonomous vehicle can also include a fixed or scanning RADAR sensor: that defines a RADAR field of view that intersects the LIDAR field of view; and that generates a list of objects or surfaces in the RADAR field of view during a scan cycle, wherein each object or surface in this list is annotated with a speed relative to the RADAR sensor. The autonomous vehicle then merges concurrent outputs of the LIDAR and RADAR sensors during a scan cycle to annotate points in the 3D point cloud with speeds of corresponding objects or surfaces detected by the RADAR sensor.

However, the autonomous vehicle can include any other type or configuration of sensors and can access or construct a scan image representing relative positions and relative speeds of objects or surfaces in the field around the autonomous vehicle during a scan cycle.

4. Preloaded Rules/Assumptions

The autonomous vehicle can also store predefined worst-case motion assumptions for a generic object. In particular, the autonomous vehicle can store assumptions for most aggressive (or "worst-case") motion and motion changes of any object that the autonomous vehicle may encounter during operation and apply these worst-case motion assumptions to predict future states of all objects it encounters (e.g., pedestrians, passenger vehicles, trucks, trailers, RVs, motorcycles, street signs, lamp posts, traffic signals, telephone poles, buildings) throughout operation.

For example, the autonomous vehicle can store: a maximum possible speed of a generic object (e.g., 100 miles per hour; 55 meters per second); and a maximum possible linear acceleration of a generic object in any direction (e.g., 9 meters per second per second). The autonomous vehicle can also store a maximum possible angular velocity of a generic object in any direction, such as as an inverse function of speed of the object. For example, the autonomous vehicle can store a maximum possible angular velocity function that outputs a maximum possible angular velocity of a generic object—about its center—that decreases as a linear speed of the generic object increases. Therefore, in this example, the maximum possible angular velocity function can predict a maximum possible angular velocity for a generic object when the generic object is at rest. (For example, a pedestrian standing still may exhibit a greater maximum possible angular velocity than a sports car traveling at 30 meters per second.)

The autonomous vehicle can also store object avoidance rules, such as a minimum temporal or spatial margin between the autonomous vehicle and a future state boundary of any object in the vicinity of the autonomous vehicle.

However, the autonomous vehicle can store and implement any other predefined worst-case motion assumptions for a generic object and/or object avoidance rules.

Furthermore, the autonomous vehicle can retrieve these predefined worst-case motion assumptions and/or object avoidance rules set by an operator or stakeholder affiliated with the autonomous vehicle or a location in which the autonomous vehicle operates. For example, a fleet manager or government official may assign these values to an autonomous vehicle fleet or specify these values for operation of all autonomous vehicles within a municipality, a city, a county, a district, a state, a region, or a country, etc.

5. Stopping Distance and Stopping Duration

Blocks S110 and S112 of the method S100 recite: at a first time at an autonomous vehicle, estimating a stopping duration, for the autonomous vehicle to reach a full stop, based on a speed of the autonomous vehicle at the first time; and storing a critical time offset from the first time by the stopping duration. Generally, in Blocks S110 and S112, the autonomous vehicle estimates a time and/or distance in the future at which the autonomous vehicle may reach a full stop—if the autonomous vehicle were to immediately initiate an emergency stop procedure—based on its current speed. For example, the autonomous vehicle can implement a preloaded function that converts vehicle speed directly into stopping duration and/or stopping distance.

In another implementation, the autonomous vehicle estimates road surface qualities based on data collected by various sensors in the autonomous vehicle. For example, the autonomous vehicle: implements computer vision and machine learning techniques to detect presence of puddles or standing water in color images; and estimates dampness of the road surface based on presence and distribution of such puddles or standing water. In another example, the autonomous vehicle: implements computer vision and machine learning techniques to extract color data and texture information from color images captured by cameras on the autonomous vehicle; and interprets a type of road surface around the autonomous vehicle, such as: maintained asphalt; asphalt in disrepair (e.g., potholed); smooth concrete; textured concrete; gravel; dirt; grass; or standing water. In this implementation, the autonomous vehicle can then calculate or retrieve a friction coefficient for the road surface based on this estimated dampness and surface type of the road. The autonomous vehicle can additionally or alternatively implement a brake efficiency model for the autonomous vehicle to calculate a braking efficiency coefficient based on: mileage since the autonomous vehicle's last brake service; and/or mileage since the autonomous vehicle's last tire change. The autonomous vehicle can then implement a braking model to estimate a stopping distance and/or a stopping duration based on: the current vehicle speed; the friction coefficient; and/or the braking efficiency coefficient.

However, the autonomous vehicle can implement any other methods or techniques to estimate the current stopping distance and/or the current stopping duration of the autonomous vehicle.

The autonomous vehicle can also add a safety margin to these stopping distance and/or stopping duration values, such as by: adding three meters to the stopping distance; by adding two seconds to the stopping duration; or by multiplying these values by a safety margin (e.g., "1.2").

The autonomous vehicle can then calculate a critical time—representing a soonest time that the autonomous vehicle may brake to a full stop—by summing the current time and the stopping duration.

6. Scan Image, Object Detection, and Object Motion

Blocks S120 and S122 of the method S100 recite: detecting an object in a first scan image of the field around the autonomous vehicle captured at approximately the first time; and, based on the first scan image, deriving a first location and a first radial speed of the object along a first ray from the autonomous vehicle to the object. Generally, in Blocks S120 and S122, the autonomous vehicle can: access a new scan image output by the LIDAR sensor, as described above; detect an object—not detected in a preceding scan image—in this new scan image; and extract a limited set of high-certainty motion characteristics of this object (e.g., radial speed relative to the autonomous vehicle) from this new scan image.

In one implementation, following receipt (or generation) of a scan image for the current scan cycle, the autonomous vehicle executes object detection techniques to associate groups of points in the scan image with discrete objects in the field around the autonomous vehicle. For example, the autonomous vehicle can: aggregate a group of points clustered at similar depths from the autonomous vehicle and that are tagged with speeds (e.g., range rates, azimuthal speeds) that are self-consistent for a contiguous object; and associate this group of points with one object in the field.

The autonomous vehicle can then extract a radial speed (or "range rate") of the object along a ray extending from the autonomous vehicle to the object (hereinafter the "radial direction") and an angular velocity of the object relative to the autonomous vehicle from this scan image. For example, the autonomous vehicle can: transform the radial speeds of points defining this object into absolute speeds in an absolute reference system based on a location and a velocity of the autonomous vehicle in the absolute reference system at the current time; and calculate an angular velocity (or "yaw") of the object about its center in the absolute reference system during the current scan cycle based on a difference between the absolute radial speeds of the leftmost point(s) and the rightmost point(s) contained in the group of points associated with this object. In this example, the autonomous vehicle can also: average radial speeds stored in a subset of points near the centroid of this group of points that define this object; and store this average radial speed as the radial speed of the object—relative to the autonomous vehicle—in a radial direction along a ray from the center of the autonomous vehicle to the centroid of this group of points. (The autonomous vehicle can also transform this radial speed of the object relative to the autonomous vehicle into an absolute speed of the object in the radial direction based on the velocity and angular speed of the autonomous vehicle during this scan cycle.)

The autonomous vehicle can repeat this process for other groups of points—in this scan image—representing other objects in the field around the autonomous vehicle.

6.1 Object Tracking

The autonomous vehicle can also implement object tracking techniques: to link a group of points—representing a particular object in the current scan image—to a similar group of points detected in the preceding scan image; and to link these groups of points—and the objects they represent—across these two scan images. However, if the autonomous vehicle fails to match a group of points detected in the current scan image to a group of points—at similar positions and velocities—in the preceding scan image(s), the autonomous vehicle can label this group of points in the current scan image as a new object (i.e., an object first entering the field of view of the autonomous vehicle during the current scan cycle).

7. Bounded Future State: New Object

Block S130 of the method S100 recites calculating a first future state boundary that represents a ground area accessible to the object from the first time to the critical time based on: the first location of the object at the first time; the first radial speed of the object; and a maximum assumed acceleration, a maximum assumed angular velocity, and a maximum assumed acceleration of a generic object defined for operation of the autonomous vehicle. Generally, in Block S130, the autonomous vehicle can merge limited motion data of the object thus derived from the current scan image in which the object was first detected and worst-case assumptions for adversarial actions by the object to calculate an extent of the ground area accessible to the object from the current time to the critical time (i.e., over the subsequent stopping duration) and to store this accessible ground area as a future state boundary of the object.

More specifically, when the autonomous vehicle first detects an object in a scan image, the autonomous vehicle can: estimate a position of a center of the object relative to the autonomous vehicle near a centroid of the points associated with this object in this scan image; derive a yaw rate of the object relative to the autonomous vehicle based on speed values stored in this group of points associated with this object in the scan image; and derive a speed of the object in the radial direction (i.e., along a ray extending from the autonomous vehicle to the object) as described above. However, the scan image in which the autonomous vehicle first detects the object may not contain sufficient data to enable the autonomous vehicle to derive the absolute velocity of the object or the speed of the object perpendicular to the radial direction (hereinafter the azimuthal direction). Therefore, the autonomous vehicle can implement worst-case assumptions for the current speed of the object and future accelerations of the object to calculate a future state boundary that represents a ground area that is accessible to the object from the current time to the critical time in a worst-case scenario.

In one implementation, the computer system calculates a maximum possible speed of the object at each of many directions offset radially about the center of the object (e.g., one hundred directions radially offset by 3.6°) based on: the assumed maximum possible speed of a generic object; and the speed of the object in the radial direction. For a first direction in this set, the computer system then calculates a first integral of the maximum possible speed of the object in this first direction and the measured angular velocity of the object over time from the current time to the critical time. For this first direction, the autonomous vehicle also: implements an acceleration rule function that links angular velocity and speed in the radial direction to a maximum possible rate of acceleration in this first direction for a generic object to estimate a maximum possible rate of acceleration of the object in this first direction; and calculates a second (double) integral of the maximum possible rate of acceleration of the object (limited by the max possible speed of a generic object) in the first direction over time from the current time to the critical time. The autonomous vehicle then sums the first and second integrals to calculate a maximum possible distance traversed by the object in the first direction and locates a first vertex of the future state boundary on a ray extending from the center of the object along the first direction and offset from the center of the object by this maximum possible distance traversed. The autonomous vehicle: repeats this process for each other direction in the set to define a vertex of the future state boundary in each of these directions; calculates a spline through each of these vertices; and stores an area encompassed by this spline as the future state boundary for this object.

Therefore, because the autonomous vehicle has limited information related to the velocity of the object during this first scan cycle in which the object is visible, the autonomous vehicle can: implement worst-case assumptions for the current speed and future acceleration of the object in order to predict a worst-case ground area that may be accessible to the object from the current time to the critical time (i.e., the soonest time that the autonomous vehicle may brake to a full stop). The autonomous vehicle can then define a secure ground area outside of this future state boundary of the object and execute navigational actions to remain within the secure ground area such that any collision between the autonomous vehicle and the object may occur only after the autonomous vehicle has come to a full stop (and such that a collision with the object may be solely the responsibility of the object and not the autonomous vehicle). In particular, the autonomous vehicle can initiate an avoidance maneuver to avoid the future state boundary of the object if the current location of the autonomous vehicle falls near (e.g., within a threshold distance of) the future state boundary. Otherwise, the autonomous vehicle can: verify a very high confidence that the autonomous vehicle will avoid collision with the object—even given a most-adversarial action by the object—if the autonomous vehicle continues to operate along its current trajectory and at its current velocity until at least the next scan cycle; and therefore mute the object from path planning decisions for the current scan cycle.

For example, if the current location of the autonomous vehicle is very far from the future state boundary of the object, the autonomous vehicle can mute the object from path planning decisions for the current scan cycle. However, if the current location of the autonomous vehicle is within a threshold distance (e.g., ten meters, four seconds) from the future state boundary of the object, the autonomous vehicle can include the object in path planning decisions for the current scan cycle, such as by: slowing the autonomous vehicle by a magnitude and/or at a rate inversely proportional to proximity of the autonomous vehicle to the perimeter of the future state boundary of the object; and/or adjusting a steering angle of the autonomous vehicle to shift the trajectory of the autonomous vehicle away from the future state boundary of the object.

8. Bounded Future State: Extant Object

Generally, the autonomous vehicle may capture images with relatively high resolution at relatively long distances from the autonomous vehicle such that the autonomous vehicle typically falls at a distance significantly outside of a future state boundary thus calculated for an object when the autonomous vehicle first detects this object in a scan image. Therefore, the autonomous vehicle may commonly mute an object from path planning decisions during a scan cycle in which the autonomous vehicle first detects the object. However, the autonomous vehicle can also track this object over subsequent scan images, derive additional motion characteristics of this object from these scan images, update the future state boundary for the object accordingly, and selectively mute or consider the object during these later scan cycles based on the autonomous vehicle's concurrent positions and these refined future state boundaries of the object.

In one implementation, the autonomous vehicle captures a second scan image during a second scan cycle succeeding the first scan cycle in which the autonomous vehicle first detects an object, as described above. The autonomous vehicle then implements methods and techniques described above: to derive additional motion characteristics (e.g., speed in the azimuthal direction, angular velocity, and absolute velocity) of the object from this second scan image and differences between the first and second scan images; to replace a worst-case assumption for the speed of the object with these derived motion data; and to recalculate the future state boundary for the object accordingly.

In one implementation, the autonomous vehicle: accesses a second scan image captured during the second scan cycle following the first scan cycle described above; implements object-tracking techniques to associate a group of points in the second scan cycle with the object detected in the first scan image; estimates a center of the object in the first and second images; extracts a first position of the object at a first time of the first scan cycle from the first scan image; extracts a second position of the object at a second time of the second scan cycle from the second scan image; calculates a spatial distance between the first and second positions; estimates a current velocity of the object relative to the autonomous vehicle by dividing the spatial distance by a time interval between the first and second scan cycles.

(However, because the scope of the object represented by groups of points in the first and second images may differ and because the time interval between the first and second scan cycles may be short (e.g., ten milliseconds), the change in position of the object from the first scan cycle to the second scan cycle may be prone to significant error. More specifically, an uncertainty of this derived velocity of the object may be relatively high in comparison to the radial speed of the object extracted from the current scan image. Therefore, the autonomous vehicle can multiply this calculated velocity of the object—relative to the autonomous vehicle—by an error margin, such as "1.5." Furthermore, as the autonomous vehicle tracks this object over multiple consecutive scan cycles, the autonomous vehicle can calculate a combination (e.g., a weighted average) of these derived velocities of the object in order to reduce some error in this calculation.)

In this implementation, the autonomous vehicle can also: transform the current velocity of the object relative to the autonomous vehicle (adjusted by the error margin) into an absolute velocity of the object based on a velocity of the autonomous vehicle during this time interval; implement methods and techniques described above to calculate the speed of the object in the radial direction and the angular velocity of the object based on speed values contained in points in this group; and derive the speed of object in the azimuthal direction—perpendicular to the radial direction—based on the absolute velocity of the object and the speed of the object in the radial direction.

The autonomous vehicle can thus derive a more complete motion profile—such as including a true absolute velocity—of the object during this second scan cycle based on data extracted from second scan image and the preceding scan image.

The autonomous vehicle can then implement methods and techniques described above: to recalculate a critical time of the autonomous vehicle based on the autonomous vehicle's speed during this second scan cycle; and to recalculate a future state boundary of the object from the current time to this revised critical time based on the true (absolute or relative) velocity of the object (rather than the worst-case speed of a generic object), the angular velocity of the object, and the maximum possible acceleration of a generic object—limited by the maximum possible speed of a generic object—from the current time to the revised critical time.

Therefore, because the true velocity of the object may often be (significantly) less than the maximum assumed speed of a generic object, this revised future state boundary of the object—thus recalculated based on additional motion data collected during this second scan cycle—may be significantly smaller than the initial future state boundary of the object calculated by the autonomous vehicle after first detecting the object.

The autonomous vehicle can then implement methods and techniques described above to selectively mute this object from path planning considerations during this second scan cycle based on a distance of the object from the perimeter of this revised future state boundary of the object.

The autonomous vehicle can repeat the process for each subsequent scan image thus captured by the autonomous vehicle in order to refine and update the future state boundary for this object, such as until the autonomous vehicle passes this object or until this object moves outside of the field of view of the autonomous vehicle.

9. Bounded Future State: Obscured Object

In one variation, the autonomous vehicle can: define a virtual object in a region of the field around the autonomous vehicle obscured by a detected object (e.g., a passenger vehicle, a truck, a building); implement methods and techniques similar to those described above to assign worst-case motion characteristics to this virtual object and to define a virtual future state boundary for this virtual object based on this worst-case motion characteristics; and refine these worst-case motion characteristics of the virtual object based on a contracting range of possible motion characteristics of the virtual object over time and the recalculated the virtual future state boundary of the virtual object accordingly. More specifically, in this variation, the autonomous vehicle can anticipate presence of an undetected object behind a detected object and implement methods and techniques similar to those described above to bound possible future states of the undetected object and selectively mute the possibility of an undetected object behind the detected object based on distance navigational actions to remain in a space inaccessible to this undetected object In one implementation, the autonomous vehicle first detects a first object—spanning an azimuthal distance—in a first scan image. The autonomous vehicle then implements methods and techniques described above to calculate a future state boundary of the first object based on motion data extracted from the first scan image and revises this future state boundary of the first object based on motion data extracted from subsequent scan images.

Concurrently, the autonomous vehicle: defines a virtual object immediately behind the first object (e.g., two meters behind the first object); assigns a worst-case speed in all directions and a worst-case acceleration in all direction—up to the maximum possible speed of a generic object—to the virtual object; and calculates a virtual future state boundary for the virtual object according to these worst-case motion values. For example, the autonomous vehicle can: assume that the virtual object is moving at the maximum possible speed of a generic object in all directions (other than directions currently obscured by first object) at the current time; and calculate a virtual future state boundary for the virtual object based on an integral of this maximum possible speed in all directions (other than directions currently obscured by first object) over the current stopping time of the autonomous vehicle. The autonomous vehicle can then implement methods and techniques described above to verify that the current location of the autonomous vehicle is outside of this virtual future state boundary and to selectively mute consideration of this virtual object from path planning considerations during the current scan cycle accordingly.

During the next scan cycle, the autonomous vehicle can similarly: access a next scan image; implement object tracking techniques to detect the first object in this next scan image and to link this first object in this next scan image to the first object detected in the preceding scan image. Then, if the autonomous vehicle fails to detect a new object appearing from behind the first object, in this next scan image, then the autonomous vehicle can confirm that the azimuthal speed of the virtual object—relative to the first object—was insufficient to pass the azimuthal length of the first object in the field of view of the autonomous vehicle over a time interval from the preceding scan cycle to this next scan cycle. More specifically, because the autonomous vehicle failed to the detect a new object appearing behind the first object in this next scan image, the autonomous vehicle can predict that the speed of the virtual object—relative to the first object and along the azimuthal direction defined by the autonomous vehicle does not exceed a width of the first object divided by the time interval between the preceding and current scan cycles. Therefore, in this implementation, the autonomous vehicle can: extract a azimuthal length of the first object from the current scan image (or an average length of the first object extracted from the preceding and current scan images); derive a azimuthal speed of the first object—relative to the autonomous vehicle—based on a change in the position of the first object between the first scan image and the second image; and calculate a maximum possible azimuthal speed of the virtual object—relative to the first object and along the azimuthal direction defined by the autonomous vehicle—between the first and second scan cycles based on the azimuthal length of the first object and the time interval between the first and second scan cycles, assuming that the virtual object is infinitely narrow. The autonomous vehicle can then: calculate a maximum possible azimuthal speed of the virtual object relative to the autonomous vehicle by summing the azimuthal speed of the first object relative to the autonomous vehicle and the azimuthal speed of the virtual object relative to the first object; and then implement methods and techniques described above (for a new object) to calculate a virtual future state boundary for the virtual object based on the maximum azimuthal speed thus estimated for the virtual object.

The autonomous vehicle can repeat this process for the subsequent scan cycle, including: further revising the maximum possible azimuthal speed of the virtual object—along the azimuthal direction relative to the autonomous vehicle—based on the length of the first object and the time interval over the set of scan images in which the autonomous vehicle detected the first object; recalculating maximum possible speeds and accelerations of the virtual object in various directions based on this maximum possible azimuthal speed of the virtual object; and refining the virtual future state boundary of the virtual object based on these maximum possible speeds, maximum possible accelerations, and the maximum possible azimuthal speed of the virtual object.

The autonomous vehicle can also define multiple virtual objects behind the first object and implement similar methods and techniques to define virtual future state boundaries for each of these virtual objects, such as: a first virtual object immediately behind the first object; a second virtual object two meters behind the first object; a third virtual object ten meters behind the first object; and a fourth virtual object 20 meters behind the first object; etc.

For example, upon detecting a telephone pole in a first scan image, the autonomous vehicle can execute the foregoing methods and techniques to calculate virtual future state boundaries for each of these virtual objects. In this example, if the autonomous vehicle tracks this telephone pole over multiple consecutive scan images (e.g., captured over one second) and fails to detect a new object coming in to view behind the telephone pole, the autonomous vehicle can define a set of virtual future state boundaries that are indicative of: absence of a pedestrian walking faster than 0.2 meter per second in the azimuthal direction immediately behind the telephone pole (i.e., the first virtual object); absence of a motorcycle moving faster than 0.2 meter per second in the azimuthal direction in a region approximately two meters behind the telephone pole (i.e., the second virtual object); absence of a passenger vehicle moving faster than one meter per second in the azimuthal direction in a region approximately ten meters behind the telephone pole (i.e., the third virtual object); and absence of a truck vehicle moving faster than one meter per second in the azimuthal direction in a region approximately 20 meters behind the telephone pole (i.e., the third virtual object).

Furthermore, in this variation, upon detecting a second object appearing behind the first object and at a particular radial distance from the autonomous vehicle, the autonomous vehicle can: transfer motion characteristics thus derived for a virtual object near this particular radial distance from the autonomous vehicle onto this second object; and then implement these motion characteristics transferred from the virtual object to calculate a future state boundary of this second object.

10. Other Objects

Generally, the autonomous vehicle can execute multiple instances of the foregoing processes concurrently to calculate future state boundaries for many discrete objects detected in a current scan image, to define one or more virtual objects behind each of these detected objects, to define a virtual future state boundary for each of these objects, and to refine the future state boundaries over time.

11. Access Zone

The autonomous vehicle can then elect a next navigational action based on a subset of these detected and virtual objects based on proximity of the autonomous vehicle to future state boundaries of these detected and virtual objects.

In one implementation, the autonomous vehicle: aggregates future state boundaries for detected and virtual objects calculated during the current scan cycle; and assembles these future state boundaries—based on locations of their detected and virtual objects relative to the autonomous vehicle during the current scan cycle—into one composite future state boundary that defines all locations accessible to these detected and virtual objects from the current time to the critical time based on worst-case adversarial motion characteristics of these objects. (In this variation, in order to reduce complexity of this composite future state boundary, the autonomous vehicle can also: select a subset of future state boundaries that define perimeters that fall within the preset minimum temporal or spatial margin of the current location of the autonomous vehicle. The autonomous vehicle can then assemble this subset of future state boundaries into one composite future state boundary.)

The autonomous vehicle can then store the converse of this composite future state boundary as an access zone for the autonomous vehicle. More specifically, this access zone can define a ground area that the autonomous vehicle can operate within for at least the time interval from the current scan cycle to the next scan while maintaining a very high confidence that the autonomous vehicle can brake to a full stop prior to collision with any detected object, even if one (or many) of these objects initiates an adversarial action (e.g., accelerating rapidly to the maximum possible speed of a generic object) during the current scan cycle. The autonomous vehicle can also align a georeferenced road network to this access zone and further remove regions of the access zone that extend outside of a road area defined in this road network.

The autonomous vehicle can then calculate a navigational action that, when executed by the autonomous vehicle, maintains the autonomous vehicle within the access zone, such as: slowing the autonomous vehicle to reduce a rate of approach to an edge of the access zone if the autonomous vehicle is within the temporal or spatial margin of this edge; and/or by adjusting a steering angle of the autonomous vehicle in order to redirect the autonomous vehicle toward a segment of the access zone that extends further from the autonomous vehicle. (The autonomous vehicle can also weight these navigational actions toward maintaining the autonomous vehicle on or near an assigned route.)

Therefore, the autonomous vehicle can: leverage future state boundaries for newly-detected objects, extant detected objects, and virtual objects to calculate a ground area in which the autonomous vehicle can operate within over a limited period of time (e.g., a time interval between two consecutive scan cycles) while maintaining a high confidence that the autonomous vehicle can brake to a full stop before collision with any of these objects; and then define and execute navigational actions to maintain the autonomous vehicle within this access zone. The autonomous vehicle can then repeat this process for each subsequent scan cycle during operation.

12. Changing Object and Points

Furthermore, because the autonomous vehicle may not rely on object classification or identification to predict a type of an object and to predict motion of the object accordingly, the autonomous vehicle may define a group of points that spans multiple real objects in the field, such as if these objects are moving along similar trajectories and at similar velocities. However, the autonomous vehicle can implement the foregoing methods and techniques to calculate, refine, and avoid a future state boundary for this "grouped object" until a time that these real objects are not longer moving along similar trajectories and/or at similar velocities, at which time the autonomous vehicle can: distinguish these objects in a current scan cycle; transfer motion characteristics from the preceding grouped objects onto each of these distinct objects; and then calculate a future state boundary for each of these objects, as described above.

Similarly, the autonomous vehicle may distinguish two clusters of points that represent a single real object and implement methods and techniques described above to calculate, refine, and avoid future state boundaries for both of these clusters, such as up until a time that the autonomous vehicle determines that proximity and self-consistency of radial speeds (or range rates) of points in these two clusters indicate a singular object.

Additionally or alternatively, the autonomous vehicle can implement the foregoing methods and techniques to calculate, refine, and avoid future state boundaries for individual points and smaller clusters of points that represent subregions of objects in the field around the autonomous vehicle.

13. Motion Disambiguation

Figure 2:
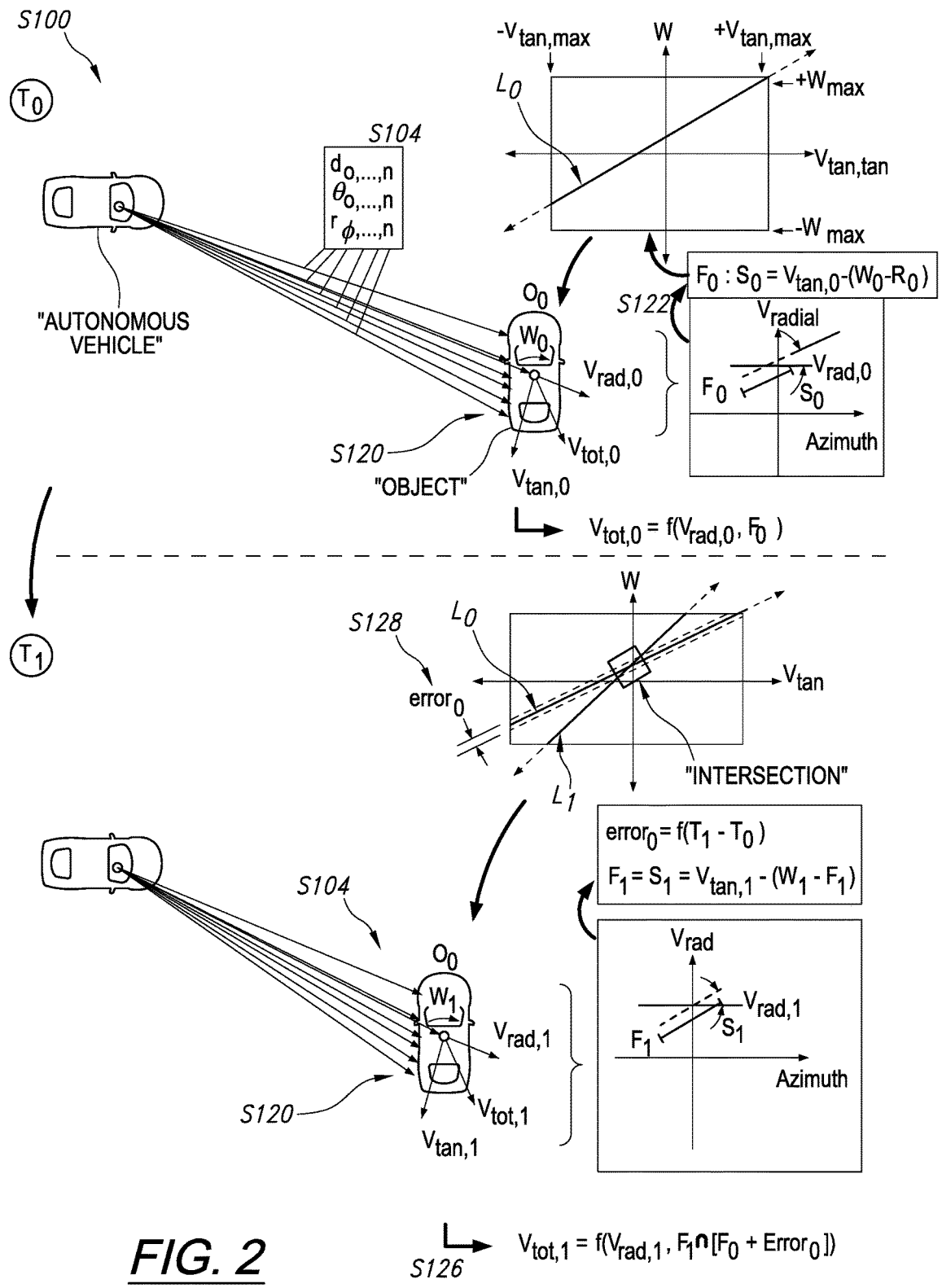
FIG. 2 is a flowchart representation of one variation of the method.

One variation of the method S100 shown in FIG. 2 includes, for a first scan cycle: accessing a first scan image containing data captured by a sensor on the autonomous vehicle at a first time in Block S104; identifying a first group of points in the first scan image representing an object in a field proximal the autonomous vehicle in Block S120, each point in the first group of points including a first range value from the sensor to a surface on the object, a first azimuthal position of the surface on the object relative to the sensor, and a first radial velocity of the surface of the object relative to the sensor; calculating a first correlation between first radial velocities and first azimuthal positions of points in the first group of points in Block S122; and, based on the first correlation, calculating a first function that relates possible tangential velocities of the object and possible angular velocities of the object at the first time in Block S122. This variation of the method S100 similarly includes, for a second scan cycle: accessing a second scan image containing data captured by the sensor at a second time in Block S104; identifying a second group of points in the second scan image representing the object in the field in Block S120; calculating a second correlation between second radial velocities and second azimuthal positions of points in the second group of points in Block S122; and, based on the second correlation, calculating a second function that relates possible tangential velocities of the object and possible angular velocities of the object at the second time in Block S122. This variation of the method S100 further includes estimating a second tangential velocity of the object and a second angular velocity of the object, relative to the autonomous vehicle, at the second time based on an intersection of the first function and the second function in Block S124.

In this variation, the method S100 can similarly include, for a first scan cycle: accessing a first scan image containing data captured by a sensor on the autonomous vehicle at a first time in Block S104; identifying a first group of points in the first scan image representing an object in a field proximal the autonomous vehicle in Block S120, each point in the first group of points including a first range value from the sensor to a surface on the object, a first position of the surface on the object relative to the autonomous vehicle, and a first radial velocity of the surface of the object relative to the autonomous vehicle; calculating a first correlation between first radial velocities and first positions of points in the first group of points in Block S122; and, based on the first correlation, calculating a first function that relates possible linear motion of the object and possible angular motion of the object at the first time in Block S122. This variation of the method S100 can also include, for a second scan cycle: accessing a second scan image containing data captured by the sensor at a second time in Block S104; identifying a second group of points in the second scan image representing the object in Block S120; calculating a second correlation between second radial velocities and second positions of points in the second group of points in Block S122; and, based on the second correlation, calculating a second function that relates possible linear motion of the object and possible angular motion of the object at the second time in Block S122. This variation of the method S100 can further include estimating a linear motion of the object and an angular motion of the object, relative to the autonomous vehicle, at the second time based on an intersection of the first function and the second function in Block S126.

Additionally or alternatively, in this variation, the method S100 can include, for each scan cycle in a sequence of scan cycles at the autonomous vehicle: accessing a scan image containing data captured by a sensor on the autonomous vehicle at a scan time in Block S104; identifying a group of points in the scan image representing an object in a field proximal the autonomous vehicle in Block S120, each point in the group of points including a position of a surface on the object relative to the autonomous vehicle and a radial velocity of the surface of the object relative to the autonomous vehicle; and calculating a function based on a correlation between radial velocities and positions of points in the group of points, the function relating possible linear motion of the object and possible angular motion of the object at the scan time in Block S122. This variation of the method S100 can also include estimating a current linear motion of the object and a current angular motion of the object, relative to the autonomous vehicle, at a current time based on an intersection of a current function and a preceding function, the current function derived from a first scan image containing data captured at the current time, the preceding function derived from a second scan image containing data captured prior to the current time in Block S126.

13.1 Three Degrees of Freedom

Generally, in this variation, the autonomous vehicle: derives a relationship between tangential and angular velocities of an object in its field based on characteristics of a group of points representing the object in a scan image output by a sensor on the autonomous vehicle; further bounds the possible current motion of this object based on the measured radial velocity of the object and this derived relationship between the tangential and angular velocities of the object; and further refines a future state boundary calculated for this object based on possible current motion of the object and motion limit assumptions of ground-based objects.

In particular, in this variation, the autonomous vehicle can leverage a relationship between radial distance, radial velocity, tangential velocity, and angular velocity of an object and a limited number of (e.g., as few as two) distance, angle, and range rate measurements to calculate a narrow range of possible tangential and angular velocities of the object and therefore a narrow range of possible total velocities of the object during a singular scan cycle. The autonomous vehicle can also: track the object in a scan image output by the sensor during a next scan cycle; repeat the foregoing process based on this next scan image; and merge results of the current and preceding scan cycles to narrow a motion estimate of the object to a singular set of tangential, angular, and total velocity values (or very narrow ranges thereof).

Then, rather than calculate a future state boundary of the object based on maximum acceleration assumptions and a maximum velocity and a range of possible velocities of the object, the autonomous vehicle can instead calculate a narrower future state boundary of the object based on maximum acceleration assumptions and a singular total velocity of the object derived by the autonomous vehicle with two independent measurements. More specifically, the autonomous vehicle can execute Blocks of the method S100 to compress a set of two-dimensional motion possibilities of a nearby object into a set of one-dimensional motion possibilities for this object.

Generally, motion of ground-based objects (e.g., vehicles, pedestrians), may occur approximately with in a horizontal plane (i.e., parallel to a ground plane), including linear motion along an x-axis, linear motion along a y-axis, and rotation about a z-axis normal to the horizontal plane, which may be represented as a linear velocity in the horizontal plane and an angular velocity about an axis normal to the horizontal plane. This variation of the method S100 is thus described below as executed by the autonomous vehicle to derive tangential, angular, and total velocities of an object within a horizontal plane given radial velocities and positions (e.g., ranges and angles) of points on the object in the horizontal plane. However, the autonomous vehicle can implement similar methods and techniques to derive linear and angular velocities of objects in 3D space (i.e., three linear velocities and three angular velocities) and an absolute or relative total velocity of objects accordingly in 3D space.

More specifically, the sensor may be configured to return range (i.e., distance), azimuth angle, and speed along a ray from a surface in the field back to the sensor (i.e., radial velocity or "Doppler") for each surface in the field that falls within the field of view of the sensor during a scan cycle. The tangential velocity (e.g., linear motion in a direction perpendicular to the radial velocity and in a horizontal plane) and angular velocity (e.g., angular motion about a yaw axis of the autonomous vehicle) of a group of surfaces—that represent an object in a scan image—are contained in the range, azimuthal angle, and speed data of points in this scan image. However, the specific tangential and angular velocities of the object are indeterminate from range, azimuth angle, and radial velocity contained in this group of points. Furthermore, tracking the object across multiple scan images and deriving a tangential velocity of the object from changes in position of the object depicted across multiple scan images introduces significant error: especially if the perspective of the object in the field of view of the autonomous vehicle changes from one scan cycle to the next because the object will appear to change in size over consecutive scan cycles, which will be incorrectly represented in the calculated tangential velocity of the object; especially if a region of the object obscured from the sensor changes over consecutive scan cycles because the velocity of the sensible window over the visible region of the object will be incorrectly represented in the calculated tangential velocity of the object; and especially insofar as points across two consecutive scan images are unlikely to represent the same surfaces on the object if the object moves relative to the autonomous vehicle over consecutive scan cycles.

However, the autonomous vehicle can execute Blocks of the method S100 to derive a first relationship (or "correlation") between tangential and angular velocities of the object during a first scan cycle based on range, azimuth angle, and radial velocity data contained in a group of points representing an object in a first scan image. The autonomous vehicle can then: repeat this process during a second scan cycle to calculate a second relationship between tangential and angular velocities of the object during a second scan cycle based on range, azimuth angle, and radial velocity data contained in a group of points representing the object in a second scan image; and derive a specific tangential velocity and specific angular velocity (or a narrow range thereof) of the object that is congruent with both the first and second relationships.

13.2 First Scan Cycle

In one implementation shown in FIG. 2, a sensor on the autonomous vehicle executes a first scan cycle at a first time $T_o$ and returns a first scan image containing radial velocities, distances, and angular positions of a constellation of points (e.g., small surfaces, areas) throughout the field around the autonomous vehicle. The autonomous vehicle then: implements methods and techniques described above to identify a group (or "cluster") of points corresponding to a discrete object in the field; and calculates a radial velocity $V_{rad,o}$ of the object at $T_o$ based on a measure of central tendency of the radial velocities of points in this group. For example, the autonomous vehicle can calculate this measure of central tendency as the arithmetic mean of the radial velocities of points in this group. Similarly, the autonomous vehicle can calculate a first radius $R_o$ of the object at $T_o$ based on (e.g., equal to) a difference between the maximum and minimum azimuthal positions of points in the group—that is, a radial length of the group of points.

The autonomous vehicle then: calculates positions of points in the group relative to the autonomous vehicle (e.g., within a polar coordinate system) based on the range values and angular positions of these points at $T_o$; and calculates a correlation between the angular positions and radial velocities of these points. In one example, the autonomous vehicle calculates this correlation as the slope of the best-fit (or "trend") line through these radial velocities divided by: the cosine of the angles between the points and the average position of this group of points; and the sine of the angles between the points and the average position of this group of points.

The autonomous vehicle then calculates a first slope $S_o$ of this best-fit line, which represents a relationship between the tangential velocity $V_{tan,o}$ and the angular velocity $\omega_o$ of the object at $T_o$. In particular, this slope $S_o$ may represent a difference between: $V_{tan,o}$; and the product of $\omega_o$ multiplied by a first radius $R_o$ of the object, in the field of view of the sensor, at time $T_o$. The autonomous vehicle can therefore generate a first function (e.g., a linear function) $F_o$ that relates $V_{tan,o}$ and $\omega_o$ of the object based on the slope $S_o$ and the radius $R_o$ at time $T_o$.

Based on function $F_o$, the autonomous vehicle can then calculate line $L_o$, which represents possible $V_{tan,o}$ and $\omega_o$ motion combinations of the object at time $T_o$ given the current radial velocity $V_{rad,o}$ of the object at $T_o$.

In a similar implementation, the autonomous vehicle solves for the motion of the object in three degrees of freedom, including: linear motion in the radial direction (i.e., a radial velocity) along a ray between the sensor and the object; linear motion in a tangential direction orthogonal to the radial direction and in a horizontal plane; and angular motion in a yaw direction about an axis orthogonal to the radial and tangential directions. In this implementation, the autonomous vehicle can: project first radial velocities versus first azimuthal positions of points—in the first group of points representing the object—onto a horizontal plane (i.e., a 2D space approximately parallel to a road surface); calculate a first radius of the object at the first time based on a range of first azimuthal positions of points in the first group of points; calculate a first radial velocity of the object— relative to the autonomous vehicle—at the first time based on a first measure of central tendency (e.g., a mean) of first radial velocities of points in the first group of points; calculate a first linear trend line through first radial velocities versus first azimuthal positions of points in the first group of points; and calculate a first correlation based on a first slope of the first linear trend line, which represents a relationship between a first tangential velocity of the object and a first angular velocity of the object at the first time. In particular, the first slope can represent a difference between: the first tangential velocity of the object at the first time; and the product of the first radius of the object at the first time and the first angular velocity of the object at the first time. The autonomous vehicle can then calculate a first linear function that relates possible tangential velocities of the object at the first time and possible angular velocities of the object, relative to the autonomous vehicle, at the first time based on the first slope and the first radius at the first time (e.g., the possible tangential velocities and angular velocities that satisfy the relation: $S_o = V_{tan,o} - R_o \omega_o$). More specifically, this first function can relate possible tangential velocities of the object and possible angular velocities of the object, at the first time, within a horizontal plane approximately parallel to a road surface.

Therefore, the autonomous vehicle can compress a 2D surface of possible $V_{tan,o}$ and $\omega_o$ motion combinations of the object—previously bounded only by maximum velocity assumptions of ground-based objects described above—into a 1D line of possible $V_{tan,o}$ and $\omega_o$ motion combinations of the object at time $T_o$. More specifically, the autonomous vehicle can thus reduce three unknown characteristics of the object moving in 2D space (i.e., $V_{rad,o}$, $V_{tan,o}$, $\omega_o$) down to a singular unknown—that is, which point along line $L_o$ represents the true $V_{tan,o}$ and $\omega_o$ of the object at $T_o$, as all combinations of $V_{tan,o}$ and $\omega_o$ on $L_o$ resolve the measured radial velocities of the object at $T_o$.

13.3 Bounding

In this implementation, the autonomous vehicle can also: calculate a range of $V_{tan,o}$ and $\omega_o$ values that, in combination with $V_{rad,o}$, produce a maximum total velocity equal to or less than the maximum object velocity assumption described above; and bound line $L_o$ to this range of $V_{tan,o}$ and $\omega_o$ values. The autonomous vehicle can additionally or alternatively bound line $L_o$ to the maximum tangential and angular velocity assumptions of ground-based objects described above, as shown in FIG. 2.

Then, given $V_{rad,o}$ of the object at time $T_o$ and the range of $V_{tan,o}$ and Wo motion combinations represented on bounded line $L_o$, the autonomous vehicle can calculate a range of possible total velocities of the object relative to the autonomous vehicle at $T_o$. Additionally or alternatively, the autonomous vehicle can merge its absolute velocity at $T_o$ with $V_{rad,o}$ of the object and the range of $V_{tan,o}$ and $\omega_o$ motion combinations represented on this bounded line $L_o$ to calculate a range of possible absolute velocities of the object at $T_o$.

13.4 Future State Boundary after First Scan Cycle

The autonomous vehicle can then: implement methods and techniques described above to calculate a future state boundary of the object based on these possible relative or absolute velocities of the object and maximum object acceleration assumptions; and selectively modify its trajectory accordingly, as described above.

For example, in Blocks S110 and S112, the autonomous vehicle can implement methods and techniques described above to: access a second image of the field captured by a second sensor, arranged on the autonomous vehicle, at approximately the first time; interpret a type of a road surface occupied by the autonomous vehicle at the first time based on a set of features extracted from the second image; predict a quality of the road surface based on the set of features; estimate a friction coefficient for tires of the autonomous vehicle acting on the road surface based on the type of the road surface and the quality of the road surface; estimating a stopping duration of the autonomous vehicle at the first time based on a vehicle speed of the autonomous vehicle at the first time, the friction coefficient, and a stored braking model for the autonomous vehicle; and calculate a critical time offset from the first time by the stopping duration.

In this example, in Block S102, the autonomous vehicle can also access a set of predefined motion limit assumptions, such as including: a maximum linear acceleration of the generic ground-based object; a maximum linear velocity of a generic ground-based object; and/or a maximum angular velocity of the generic ground-based object.

Furthermore, in Block S122, the autonomous vehicle can: derive a first location of the object at the first time based on first range values and first azimuthal positions of points in the first group of points; and then calculate a first future state boundary of the autonomous vehicle based on a) possible tangential velocities of the object and possible angular velocities of the object, at the first time, defined by the first function; the first radial velocity, b) the first location, and c) the set of predefined motion limit assumptions. More specifically, the autonomous vehicle can calculate a first ground area accessible to the object from the first time to the critical future time by: integrating the radial velocity and possible tangential and angular velocity pairs (or the "first motion") of the object at the first time—moving at up to the maximum angular velocity and accelerating up to the maximum linear velocity according to the maximum linear acceleration defined by the predefined motion limit assumptions—from the first location of the object over the stopping duration. The autonomous vehicle can then store this first ground area as the future state boundary of the object for the first time.

13.5 Second Scan Cycle

The autonomous vehicle can then repeat the foregoing process based on a next set of radial velocities, distances, and angular positions of points output by the sensor during a next scan cycle.

In particular, at a second time $T_1$, the sensor executes a second scan cycle and returns a second scan image containing radial velocities, distances, and angular positions of a constellation of points throughout the field around the autonomous vehicle. The autonomous vehicle then implements methods and techniques described above: to identify a group of points corresponding to discrete objects in the field; and to track the group of points representing the object from the first scan cycle to a corresponding group of points representing the object in this second scan cycle.

The autonomous vehicle then repeats the process described above to: calculate a central measure of the radial velocities of points in this group; store this central measure as a radial velocity $V_{rad,1}$ of the object at time $T_1$; calculate a second slope $S_1$ for these data, which represents a relationship between the tangential velocity $V_{tan,1}$ and the angular velocity $\omega_1$ of the object at time $T_1$. For example, this slope $S_1$ may represent a difference between: $V_{tan,1}$; and the product of $\omega_1$ of the object at $T_1$ multiplied by a first radius $R_1$ of the object position, relative to the autonomous vehicle, at time $T_1$. The autonomous vehicle can therefore calculate the radius $R_1$ of a measure of central tendency of the position of the group of points that represent the object at $T_1$ and generate a second function (e.g., a linear function) $F_1$ that relates $V_{tan,1}$ and $\omega_1$ of the object based on slope $S_1$ and radius $R_1$ at time $T_1$.

Based on function $F_1$, the autonomous vehicle can then calculate line $L_1$, which represents possible $V_{tan,1}$ and $\omega_1$ motion combinations of the object at time $T_1$ given the current radial velocity $V_{rad,1}$ of the object at $T_1$.

Subsequently, the autonomous vehicle can calculate an intersection of lines $L_o$ and $L_1$ (or functions $F_o$ and $F_1$) which represents the actual (or a close approximation of) $V_{tan,1}$ and $\omega_1$ of the object at $T_1$, as shown in FIG. 2. Thus, from the first scan cycle at $T_o$ to the subsequent scan cycle at $T_1$, the autonomous vehicle can solve all three unknown motion characteristics of the object—including $V_{tan,1}$, $\omega_1$, and $V_{rad,1}$—at $T_1$.

Then, given $V_{rad,1}$, $V_{tan,1}$, and $_{w1}$ represented at the intersection of line $L_o$ and $L_1$, the autonomous vehicle can calculate the total velocity $V_{tot,rel,1}$ of the object relative to the autonomous vehicle at $T_1$. Additionally or alternatively, the autonomous vehicle can merge its absolute velocity at $T_1$ with $V_{rad,1}$, $V_{tan,1}$, and $_{w1}$ of the object to calculate the total absolute velocity $V_{tot,abs,1}$ of the object at $T_1$.

Therefore, in the foregoing implementation, the autonomous vehicle can: project second radial velocities versus second azimuthal positions of points—in the second group of points representing the object—onto a horizontal plane (i.e., a 2D space approximately parallel to a road surface); calculate a second radius of the object at the second time based on a range of second azimuthal positions of points in the second group of points; calculate a second radial velocity of the object—relative to the autonomous vehicle—at the second time based on a second measure of central tendency (e.g., a mean) of second radial velocities of points in the second group of points; calculate a second linear trend line through second radial velocities versus second azimuthal positions of points in the second group of points; and calculate a second correlation based on a second slope of the second linear trend line, which represents a relationship between a second tangential velocity of the object and a second angular velocity of the object at the second time. In particular, the second slope can represent a difference between: the second tangential velocity of the object at the second time; and the product of the second radius of the object at the second time and the second angular velocity of the object at the second time. The autonomous vehicle can then calculate a second linear function that relates possible tangential velocities of the object at the second time and possible angular velocities of the object, relative to the autonomous vehicle, at the second time based on the second slope and the second radius at the second time (e.g., the possible tangential velocities and angular velocities satisfies the relation: S1=V tan,1−R1ω1). More specifically, this second function can relate possible tangential velocities of the object and possible angular velocities of the object, at the second time, within a horizontal plane approximately parallel to a road surface.

The autonomous vehicle can then estimate a specific second tangential velocity of the object and a specific second angular velocity of the object (or a narrow range of possible tangential and angular motions of the object, as described below)—relative to the autonomous vehicle—at the second time based on the intersection of the first function and the second function in a three-degree-of-freedom state space. Furthermore, the autonomous vehicle can execute methods and techniques described above to calculate the total absolute velocity of the object—relative to the autonomous vehicle—at the second time in Block S126 based on the second tangential velocity of the object, the second angular velocity of the object, the second radial velocity of the object, and absolute velocity of the object at the second time.

The autonomous vehicle can then: implement methods and techniques described above to calculate a future state boundary of the object based on these possible relative or absolute velocities of the object and maximum object acceleration assumptions; and selectively modify its trajectory accordingly, as described above.

13.6 Accumulated Error

In this variation, the tangential and angular velocities $V_{tan}$ and $\omega$ of the object relative to the autonomous vehicle may change between the first scan cycle at $T_o$ and the second scan cycle at $T_1$, which may produce (additional) error in-line $L_o$ by time $T_1$. The magnitude of this error may be related to the time offset between $T_o$ and $T_1$ and may therefore be a function of sampling rate of the sensor.

Accordingly, the autonomous vehicle can integrate the maximum and minimum changes in tangential and angular velocities $V_{tan}$ and $\omega$ of the object over the time offset from $T_o$ to $T_1$—such as based on motion limit assumptions of objects described above—to calculate an error bar on each side of line $L_o$ (e.g., errors bars $L_{o,error,low}$ and $L_{o,error,high}$). The autonomous vehicle can then calculate an intersection of $L_1$ and an area between error bars $L_{o,error,low}$ and $L_{o,error,high}$, thereby narrowing the range of possible $V_{tan,1}$ and $\omega_1$ values of the object at $T_1$ while accounting for possible accumulated error due to motion of the object relative to the autonomous vehicle from time $T_o$ to time $T_1$, as shown in FIG. 2.

Then, given $V_{rad,1}$ and the range of $V_{tan,1}$ and $\omega_1$ motion combinations represented on line $L_1$ bounded by the error bars of line $L_o$, the autonomous vehicle can calculate a range of possible total velocities of the object relative to the autonomous vehicle at $T_1$. Additionally or alternatively, the autonomous vehicle can merge its absolute velocity at $T_1$ with $V_{rad,1}$ and the range of $V_{tan,1}$ and $\omega_1$ motion combinations represented on this bounded line $L_1$ to calculate a range of possible absolute velocities of the object at $T_1$.

For example, the autonomous vehicle can characterize a first error of the first function based on an integral of the set of predefined motion limit assumptions described above over a time difference between the first time and the second time in Block S126—that is, a worst-case change in the motion of the object from the first time to the second time. As described above, the autonomous vehicle can; calculate a first line that relates possible tangential velocities of the object and possible angular velocities of the object, relative to the autonomous vehicle, at the first time based on the first correlation; calculate a first width of the first line based on the first error; and represent the first line and the first width of the first line in the first function during the first scan cycle. The first function can therefore represent a two-dimensional ellipse containing possible combinations of the first tangential velocity and the first angular velocity of the object at the first time.

During the second scan cycle, the autonomous vehicle can similarly calculate a second line that relates possible tangential velocities of the object and possible angular velocities of the object, relative to the autonomous vehicle, at the second time based on the second correlation. The autonomous vehicle can then estimate a second range of tangential velocities of the object and a second range of angular velocities of the object—relative to the autonomous vehicle—at the second time based on an intersection of the first line of the first width and the second line.

13.7 Best-Fit Error

Figure 5:
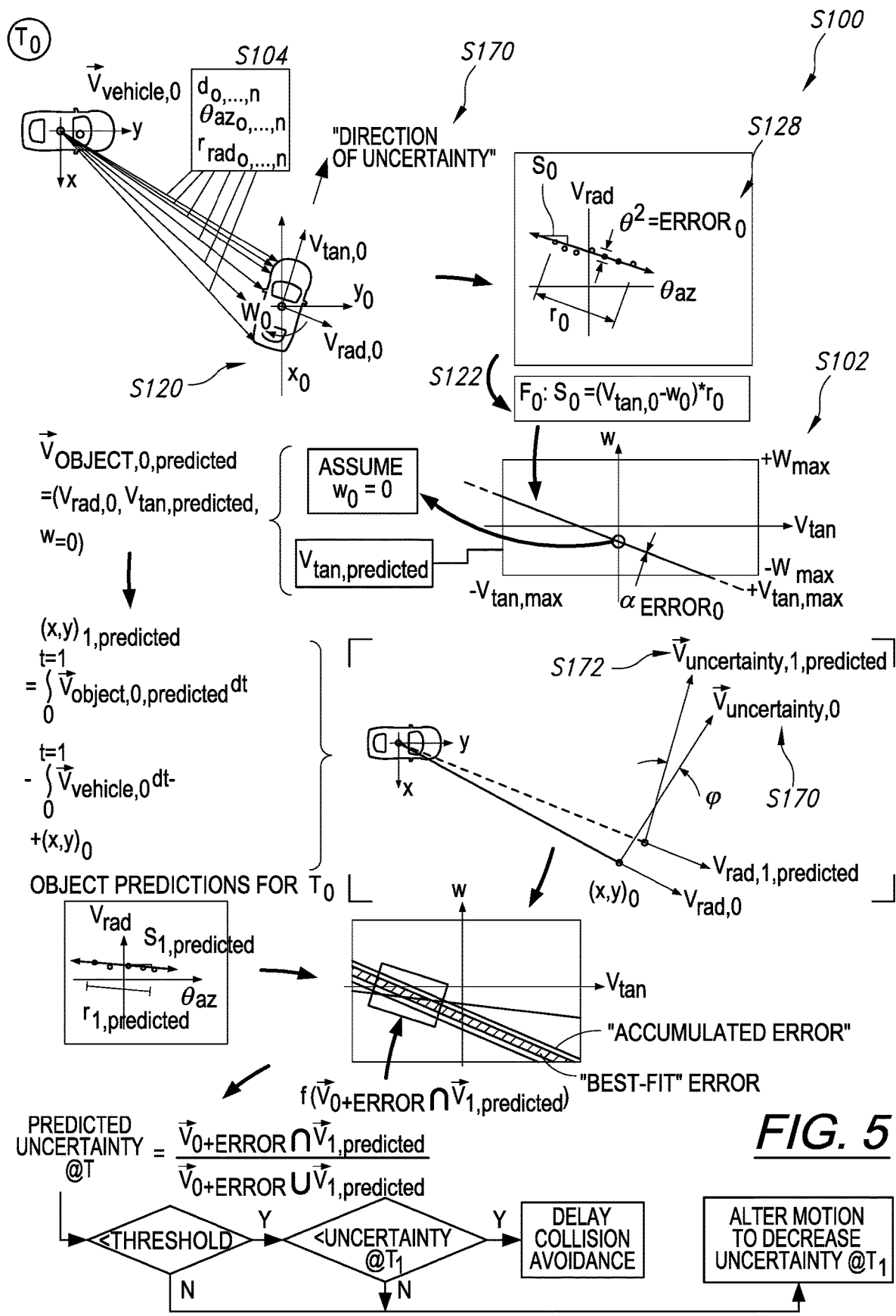
FIG. 5 is a flowchart representation of one variation of the method.

In a similar implementation shown in FIG. 5, the autonomous vehicle can: calculate a first linear trend line through first radial velocities versus first azimuthal positions of points in the first group of points derived from the first scan image; calculate a first correlation between a first tangential velocity of the object and a first angular velocity of the object at the first time based on the first slope of the first linear trend line; characterize a first error of the first linear trend line based on deviation of first radial velocities of points in the first group of points from the first linear trend line in Block S126; calculate a first line that relates possible tangential velocities of the object and possible angular velocities of the object, relative to the autonomous vehicle, at the first time based on the first correlation; calculate a first width of the first line based on the first error; and represent the first line and the first width of the first line in the first function. For example, the autonomous vehicle can calculate a first error—and therefore a width of the first line—proportional to the square root of the sum of the squares of minimum distances from each point in the group to the first linear trend line. The first function can therefore represent a two-dimensional ellipse containing possible combinations of the first tangential velocity and the first angular velocity of the object at the first time.

The autonomous vehicle can similarly: calculate a second linear trend line through second radial velocities versus second azimuthal positions of points in the second group of points; and calculate the second correlation between a second tangential velocity of the object and a second angular velocity of the object at the second time based on a second slope of the second linear trend line; characterize a second error of the second linear trend line based on deviation of second radial velocities of points in the second group of points from the second linear trend line; calculate a second line that relates possible tangential velocities of the object and possible angular velocities of the object, relative to the autonomous vehicle, at the second time based on the second correlation; calculate a first width of the first line based on the first error; and represent the second line and the second width of the second line in the second function. The second function can therefore represent a two-dimensional ellipse containing possible combinations of the second tangential velocity and the second angular velocity of the object at the second time.

Accordingly, the autonomous vehicle can estimate a second range of tangential velocities of the object and a second range of angular velocities of the object—relative to the autonomous vehicle—at the second time based on an intersection of the first line of the first width and the second line of the second width. Though the autonomous vehicle may not resolve specific tangential and angular velocities of the object at the second time, the autonomous vehicle can calculate a range of possible tangential and angular velocities of the object at the second time—based on the intersection of the first function and the second function—that is much narrower than the range of possible tangential and angular velocities of the object derived from a single scan image depicting the object.

13.8 Future State Boundary after Second Scan Cycle

The autonomous vehicle can then: implement methods and techniques described above to calculate a future state boundary of the object based on these possible relative or absolute velocities of the object and predefined motion limit assumptions; and selectively modify its trajectory accordingly, as described above.

For example, after calculating the critical time in Block S112, the autonomous vehicle can integrate the second motion of the object at the second time—moving at up to the maximum angular velocity and accelerating up to the maximum linear velocity according to the maximum linear acceleration prescribed by the predefined motion limit assumptions—from the second location of the object over the stopping duration to calculate a second ground area accessible to the object from the second time to the critical time; and store this second ground area as a second future state boundary—for the object at the second time—that is (significantly) smaller in size (e.g., area in a horizontal plane approximately parallel to a road surface) than the first future state boundary of the object.

In particular, because the autonomous vehicle compresses a wide range of possible tangential and angular velocity combinations of the object—bounded only by predefined motion limit assumptions—represented by the first function into one or a small range of possible tangential and angular velocity combinations of the object at the intersection of the first function and the second function, the autonomous vehicle can also calculate a smaller future state boundary of the object from the first scan cycle to the second scan cycle and thus predict a larger access zone in which the autonomous vehicle may operate up to the critical time without sacrificing an ability to reach a full stop prior to collision with other objects nearby.

13.9 Object Motion Handling

Then, as described above, the autonomous vehicle can elect a second navigational action to avoid entry into the second future state boundary prior to the critical time in Block S140.

For example, the autonomous vehicle can implement methods and techniques described above to: calculate an access zone, around the autonomous vehicle, excluding the first future state boundary of the object in Block S144; and then execute a first navigational action to navigate toward the access zone (e.g., to change the trajectory of the autonomous vehicle) in response to a location of the autonomous vehicle at the second time falling within a threshold distance (e.g., two meters; a distance traversed in 500 milliseconds at the current speed of the autonomous vehicle) of a perimeter of the current future state boundary of the object. Additionally or alternatively, the autonomous vehicle can automatically execute a braking action to slow the autonomous vehicle in response to the location of the autonomous vehicle at the second time falling within the threshold of the perimeter of the current future state boundary of the object. Conversely, the autonomous vehicle can maintain its current trajectory (e.g., velocity; speed and steering angle) or otherwise mute the object from path planning consideration during the second scan cycle if the current location of the autonomous vehicle falls outside of the second future state boundary of the object.

13.10 Subsequent Scan Cycles

The autonomous vehicle can then repeat the foregoing methods and techniques to: calculate a third function $F_2$ based on the average radial velocity $V_{rad,2}$, the slope $S_2$, and the radius $R_2$ of a group of points—associated with the same object—tracked in a third scan image output by the sensor at a third time $T_2$; calculate a third line $L_2$ based on function $F_2$; and then calculate the intersection of first line $L_o$ (with error bars based on a time offset from $T_o$ to $T_2$), second line $L_1$ (with error bars based on a time offset from $T_1$ to $T_2$), and third line $L_2$, which represents possible $V_{tan,2}$ and $\omega_2$ values of the object at $T_2$.

Alternatively, during this third scan cycle, the autonomous vehicle can: discard line $L_o$; and calculate an intersection of second line $L_1$ (with error bars based on the time offset from $T_1$ to $T_2$) and third line $L_2$, which represents possible $V_{tan,2}$ and $\omega_2$ values of the object at $T_2$.

As described above, the autonomous vehicle can then: calculate a range of possible $V_{tan,2}$ and $\omega_2$ values of the object at $T_2$ based on this multi-way intersection (e.g., two-way, three-way, etc. intersection); calculate possible relative or absolute velocities of the object at $T_2$; update future state boundary of the object accordingly; and selectively modify its trajectory accordingly, as described above.

13.11 Point Grouping & Ungrouping by Object

As described above, the autonomous vehicle can group points in a scan image by proximity—such as including similar range, azimuthal, elevation values—and similar radial velocities. For each group of points detected in a first scan image, the autonomous vehicle can calculate a function that represents the linear and angular motions of the object represented by the group of points. The autonomous vehicle can then: repeat this process for a subsequent scan image; implement object tracking techniques to link groups of points in the first scan image with groups of points in the second scan image; and refine motion predictions for each object based on intersections of pairs of first and second functions for these groups of points derived from the first and second scan images.

The autonomous vehicle can also cluster two objects thus detected in the second scan image into one "composite object" (or "rigid body") if their derived motions are congruent (e.g., if their radial, tangential, and angular velocities are very similar or identical), such as if their motions fall within a predefined velocity discrimination threshold. The autonomous vehicle can then calculate one future state boundary for this composite object and selectively navigate relative to this composite object accordingly. Therefore, the autonomous vehicle can interpret and handle multiple groups of points within congruent motions as a singular object, thereby reducing the number of discrete objects that the autonomous vehicle is tracking and thus reducing computational load at the autonomous vehicle during operation.

Similarly, the autonomous vehicle can: interpret separation of a first group of points—predicted to represent one object at a first time—in a first scan image into second and third groups of points—predicted to represent two different objects at a second time—in a second scan image; generate unique functions for the second and third objects; and estimate motions of the second and third objects based on functions derived over the first and second scan cycles.

In one example implementation, the autonomous vehicle implements methods and techniques described above to identify a first group of points in a first scan image captured at a first time and to derive a first function representing motion of an object during a first scan cycle. During a second scan cycle, the autonomous vehicle can: access a second scan image containing data captured by the sensor at a second time succeeding the first time; identify a second group of points in the second scan image representing the object in the field; identify a third group of points in the second scan image representing a second object in the field, the second object separating from the object from the first time to the second time; calculate a second correlation between second radial velocities and second azimuthal positions of points in the second group of points; calculate a third correlation between third radial velocities and third azimuthal positions of points in the third group of points; based on the second correlation; calculate a second function that relates possible tangential velocities of the object and possible angular velocities of the object at the second time; and, based on the third correlation, calculate a third function that relates possible tangential velocities of the second object and possible angular velocities of the second object at the second time. Accordingly, the autonomous vehicle can estimate a second tangential velocity of the object and a second angular velocity of the object—relative to the autonomous vehicle—at the second time based on an intersection of the first function and the second function, as described above. However, the autonomous vehicle can also: estimate a third tangential velocity of the second object and a third angular velocity of the second object—relative to the autonomous vehicle—at the second time based on an intersection of the first function representing motion of the object at the first time and the third function representing motion of the second object at the second time.

For example, the autonomous vehicle can implement the foregoing processes to: detect two groups of points representing two cars traveling in the same direction and speed in two lanes adjacent the autonomous vehicle at a first time; characterize motion of these objects; and to track and respond to these two objects as one composite group that reflects congruent motion of the objects at the first time. The autonomous vehicle can then: detect the two objects moving relative to one another, such as if one of these vehicles brakes and slows relative to the other, at a second time; separate the composite object into two objects; and then track and respond to these two objects—which now exhibit different motions in excess of the velocity discrimination threshold—independently.

13.12 Concurrent Data from Multiple Sensors

In one variation, the autonomous vehicle includes multiple offset sensors that output concurrent point clouds—representing surfaces in the field around the autonomous vehicle at different perspectives—during a scan cycle. In this variation, the autonomous vehicle can execute the foregoing methods and techniques to: calculate a pair of functions and lines for cospatial groups of objects representing a singular object in concurrent point clouds output by these sensors during one scan cycle; calculate the intersection of these lines; and estimate the tangential and angular velocities of the object based on this intersection.

For example, the autonomous vehicle can: identify a first group of points—representing a discrete object—in a first point cloud output by a first sensor on the autonomous vehicle at a first time $T_o$; calculate an average of the radial velocities of points in this first group; store this average as a first radial velocity $V_{rad,1,o}$ of the object at the first time; calculate a first function $F_{1,o}$ based on the radial velocity $V_{rad,1,o}$, a slope $S_{1,o}$, and a radius $R_{1,o}$ of this first group of points at the first time; and calculate a first line $L_{1,o}$ based on function $F_{1,o}$. The autonomous vehicle can similarly: identify a second group of points—representing this same object—in a second point cloud output by a second sensor on the autonomous vehicle at the first time $T_o$; calculate an average of the radial velocities of points in this second group; store this average as a second radial velocity $V_{rad,2,o}$ of the object at the first time; calculate a second function $F_{2,o}$ based on the radial velocity $V_{rad,2,o}$, a slope $S_{2,o}$, and a radius $R_{2,o}$ of this second group of points at the first time; and calculate a second line $L_{2,o}$ based on function $F_{2,o}$.

The autonomous vehicle can then calculate the intersection of first line $L_{1,o}$ and second line $L_{2,o}$, which represents the actual (or a close approximation of) $V_{tan,o}$ and $\omega_o$ of the object at time $T_o$. Thus, the autonomous vehicle can solve all three unknown motion characteristics of the object—including $V_{tan,o}$, $\omega_o$, and $V_{rad,o}$—at $T_o$ based on data output by these two sensors during a single scan cycle.

Then, given $V_{rad,o}$, $V_{tan,o}$, and $\omega_o$ represented at the intersection of line $L_{1,o}$ and $L_{2,o}$, the autonomous vehicle can calculate the total velocity $V_{tot,rel,o}$ of the object relative to the autonomous vehicle at $T_o$. Additionally or alternatively, the autonomous vehicle can merge its absolute velocity at $T_o$ with $V_{rad,o}$, $V_{tan,o}$, and $\omega_o$ of the object to calculate the total absolute velocity $V_{tot,abs,o}$ of the object at $T_o$.

The autonomous vehicle can then: implement methods and techniques described above to calculate a future state boundary of the object based on these possible relative or absolute velocities of the object and maximum object acceleration assumptions; and selectively modify its trajectory accordingly, as described above.

Furthermore, the autonomous vehicle can: detect an object depicted in two concurrent scan images captured by two sensors on the autonomous vehicle during a first scan cycle; derive first function and the second function describing motion of this object from both scan images; and fuse these first function and the second function into one motion estimate of the object during this first scan cycle. Concurrently, the autonomous vehicle can: detect a second object depicted in only a first these two scan images (e.g., due to obscuration from the field of view of one of these sensors; or due to different fields of view of the two sensors); and derive a third function describing motion of this second object from the first scan image during the first scan cycle. Then, during a next scan cycle, the autonomous vehicle can: detect the second object depicted in only a third scan image; derive a fourth function describing motion of this second object from the third scan image; and fuse these third and fourth functions into one motion estimate of the second object during the second scan cycle, as described above.

Therefore, autonomous vehicle can implement the foregoing Blocks of the method S100 to characterize motions of a constellation of objects based on both concurrently scan images captured during a singular scan cycle and sequences of scan images captured over multiple scan cycles.

14. 6DOF

Figure 3A:
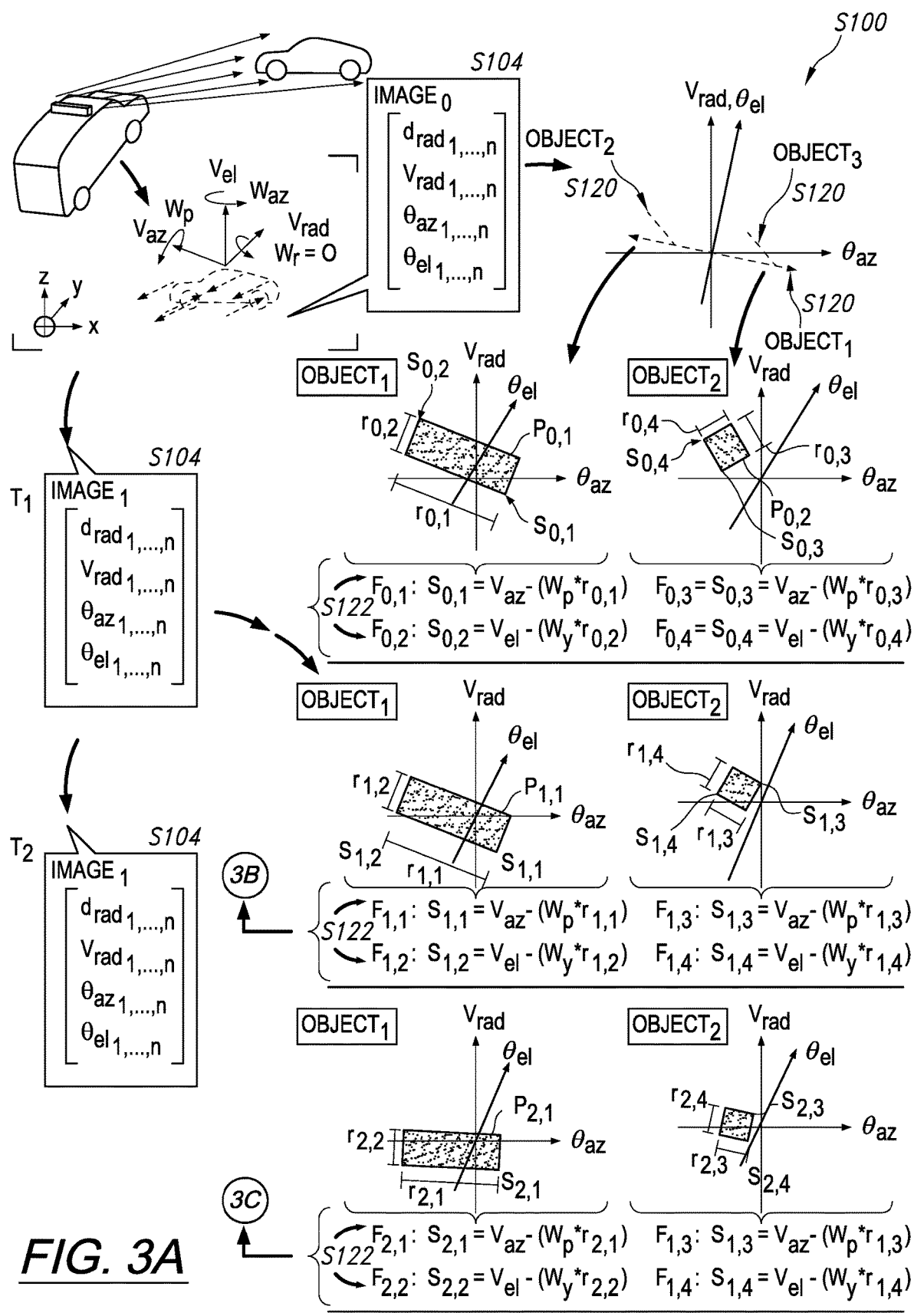
FIGS. 3A, 3B, an 3C are flowcharts representations of one variation of the method.
Figure 3B:
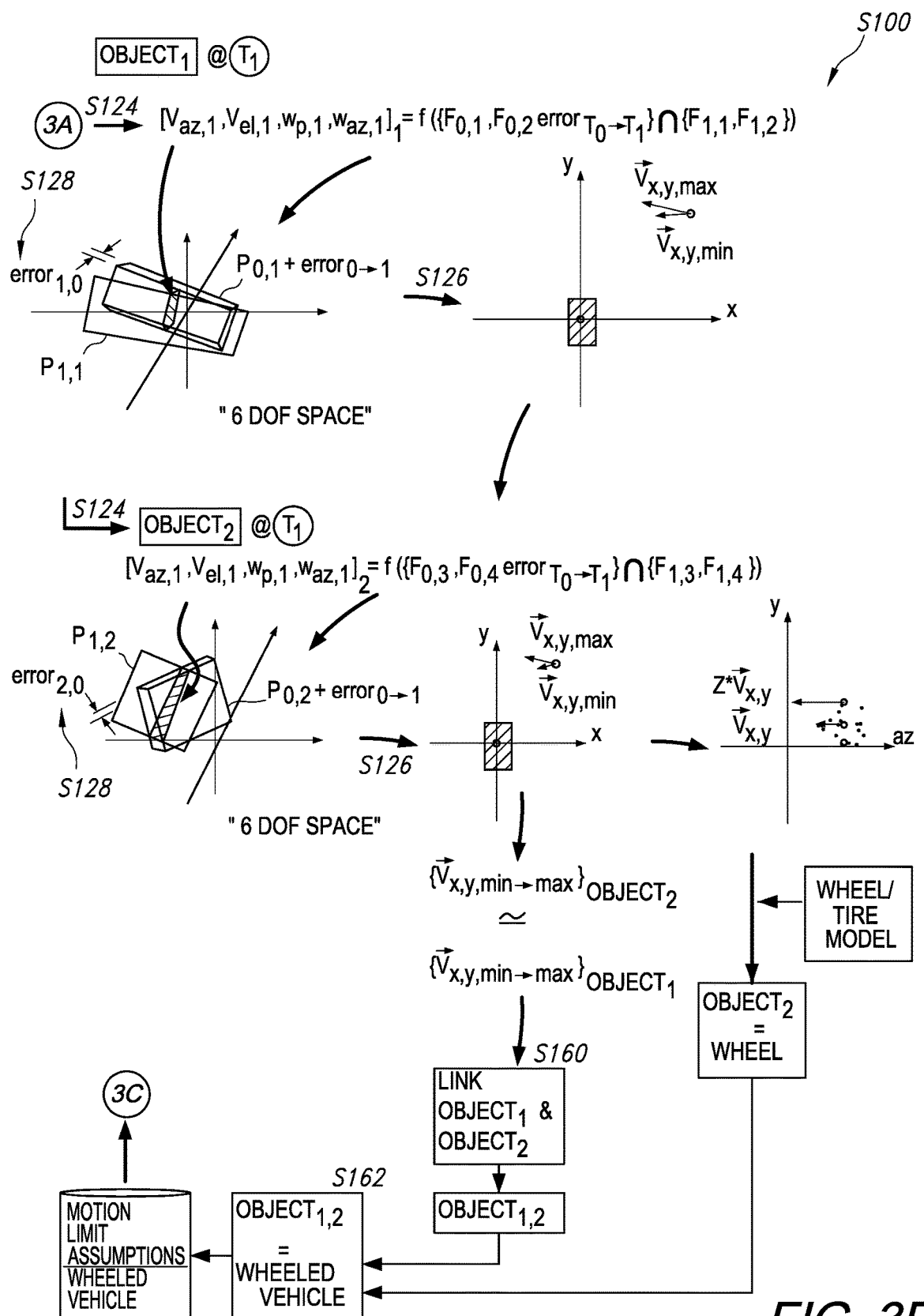
Figure 3C:
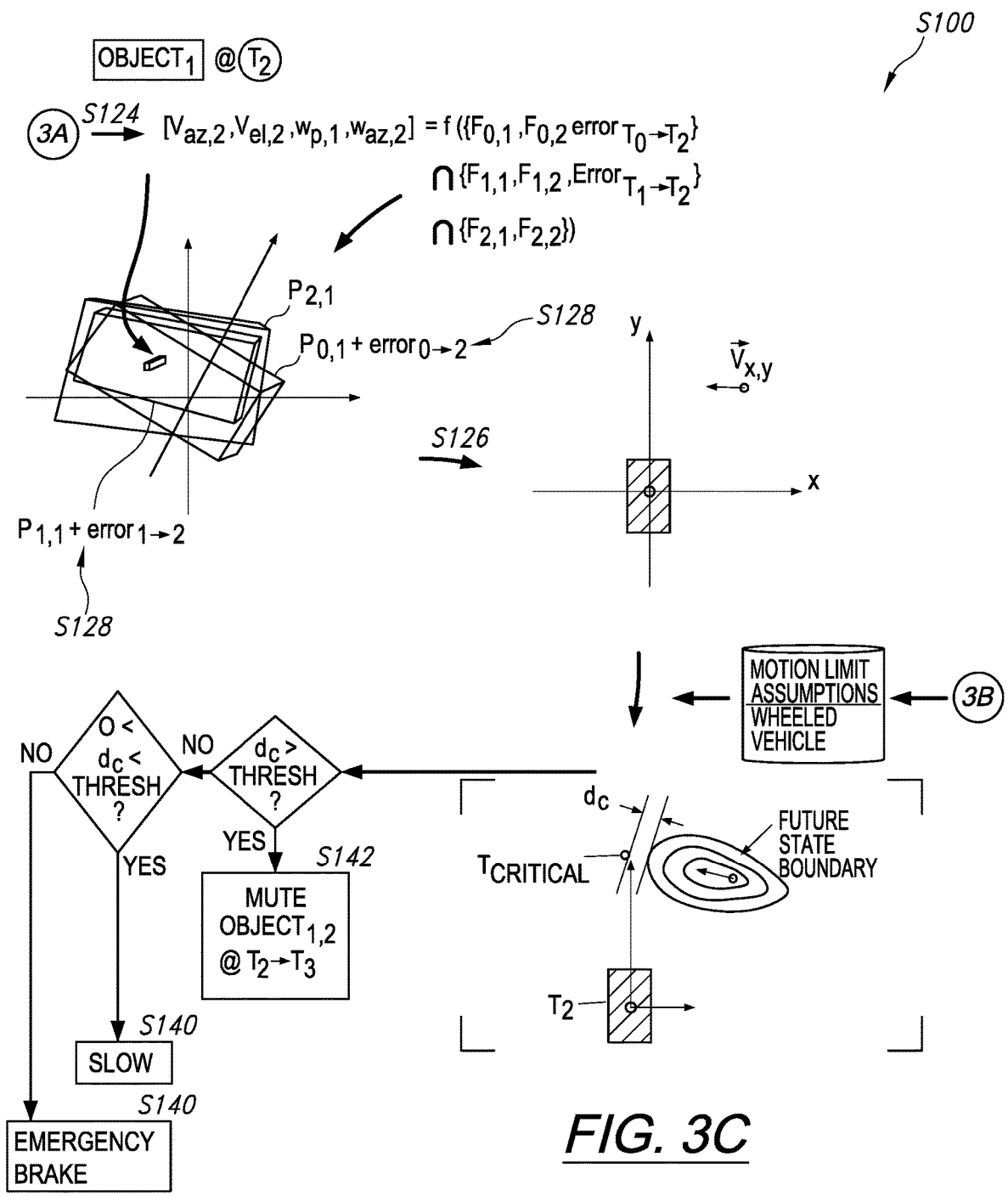

One variation of the method S100 shown in FIGS. 3A, 3B, and 3C includes: calculating a first best-fit plane through first radial velocities, first azimuthal positions, and first elevation positions of points in a first group of points representing an object in a first scan image captured at a first time; calculating a second best-fit plane through second radial velocities, second azimuthal positions, and second elevation positions of points in a second group of points representing the object in a second scan image captured at a second time; and calculating a third best-fit plane through third radial velocities, third azimuthal positions, and third elevation positions of points in a third group of points representing the object in a third scan image captured at a third time.

In particular, the first best-fit plane represents a relationship between a first tangential velocity (e.g., a composite tangential velocity of tangential azimuthal and tangential elevation velocities) of the object, a first yaw velocity of the object, and a first pitch velocity of the object at the first time. Accordingly, the autonomous vehicle can generate a first function—based on the first best-fit plane—that represents a first relationship (e.g., a correlation) between possible tangential azimuthal velocities and yaw velocities and a second relationship between possible tangential elevation velocities and pitch velocities at the first time.

Similarly, the second best-fit plane represents a relationship between a second tangential velocity of the object, a second yaw velocity of the object, and a second pitch velocity of the object at the second time. Accordingly, the autonomous vehicle can generate a second function—based on the second best-fit plane—that represents a first relationship (e.g., a correlation) between possible tangential azimuthal velocities and yaw velocities and a second relationship between possible tangential elevation velocities and pitch velocities at the second time.

Furthermore, the third best-fit plane represents a relationship between a third tangential velocity of the object, a third yaw velocity of the object, and a third pitch velocity of the object at the first time. Accordingly, the autonomous vehicle can generate a third function—based on the third best-fit plane—that represents a first relationship between possible tangential azimuthal velocities and yaw velocities and a third relationship between possible tangential elevation velocities and pitch velocities at the third time.

In this variation, the method S100 further includes calculating a third tangential velocity (or individual tangential azimuthal and tangential elevation velocities) of the object, a third yaw velocity of the object, and a third pitch velocity of the object at the third time based on an intersection of the first function, the second function, and the third function in Block S124.

14.1 3DOF v. 6DOF

Generally, the method S100 described above can be executed by the autonomous vehicle to characterize motion of an object in three degrees of freedom (or "3DOF"). However, in this variation, the autonomous vehicle can implement similar methods and techniques to characterize motion of an object in six degrees of freedom (or "6DOF").

In particular, when characterizing motion of an object in three degrees of freedom as described above, the autonomous vehicle can interpret: linear motion of the object in the radial and tangential directions within a horizontal plane; and rotational motion about a yaw axis normal to this horizontal plane only. Conversely, when characterizing motion of an object in six degrees of freedom as described above, the autonomous vehicle can interpret: linear motion of the object in the radial direction, in a tangential azimuthal direction (e.g., parallel to a scan direction of a sensor), and tangential elevation direction (e.g., orthogonal to the radial and tangential azimuthal directions); and rotational motion about a pitch axis along the tangential azimuthal direction and about a yaw axis along the tangential elevation direction.

Furthermore, rotation of the object about a ray extending from the sensor to the object (i.e., "roll" motion) may not be observable by the sensor within a single scan image. However, if the roll motion of object of the object is not coaxial with this ray, radial velocities stored in points in consecutive scan images captured by the sensor (or concurrent scan images captured by two offset sensors) may contain information related to the roll velocity of the object, and the autonomous vehicle can therefore fuse groups of points representing the image in multiple scan images to further disambiguate the roll velocity of the object relative to the autonomous vehicle.

Furthermore, many (e.g., most) ground-based moving objects—such as bodies of road vehicles and pedestrians—may exhibit minimal or no pitch velocities and no tangential elevation velocities (e.g., may not be moving in any direction other than over a horizontal road surface). Accordingly, the tangential elevation and pitch velocities of the object may be (or may approach) null. Thus, a best-fit plane through a group of points in a three-dimensional space collapses to a best-fit line in a two-dimensional space, and derivation of motion of such objects in six degrees of freedom according to this variation of the method S100 collapses to derivation of motion of the object in three degrees of freedom as described above.

However, some objects on and near road surfaces may exhibit non-zero tangential elevation and pitch velocities relative to the autonomous vehicle, such as wheels, concrete mixers, and street sweepers. Similarly, vehicles moving along inclines may exhibit non-zero tangential elevation and pitch velocities relative to the autonomous vehicle. The tangential elevation and pitch velocities of such an object is contained in radial velocity data of points that represent this object in a scan image but is indeterminate from radial velocity data contained in a single scan image. Therefore, the autonomous vehicle can fuse relationships between tangential azimuthal, tangential elevation, yaw, and pitch velocities of an object derived from multiple scan images depicting the object from different perspectives (i.e., as the autonomous vehicle and the object move relative to one another) to calculate a particular or narrow range of possible tangential azimuthal, tangential elevation, yaw, and pitch velocities of the object.

14.2 Example

For example, the autonomous vehicle can: implement methods and techniques described above to isolate a group of points in a first scan image that represent an object; and project these points into a three-dimensional space (i.e., a radial velocity, azimuth, and elevation space) based on speed (i.e., radial velocity) range, azimuthal, and elevation values contained in these points. The autonomous vehicle can then: calculate a first radial velocity of the object—relative to the autonomous vehicle—at the first time based on a first measure of central tendency (e.g., a mean) of first radial velocities of points in the first group of points; calculate a first position of the object—relative to the autonomous vehicle—at the first time based on a first measure of central tendency (e.g., a mean) of first azimuthal and elevation positions points in the first group of points; and calculate a first radial vector from the first position of the object back to the autonomous vehicle.

Furthermore, the autonomous vehicle can: calculate a first linear azimuthal trend line through first radial velocities versus first azimuthal positions of points in the first group of points; and calculate a first correlation based on a first slope of the first linear azimuthal trend line, which represents a relationship between a first tangential azimuthal velocity of the object and a first yaw velocity of the object at the first time. In particular, the first slope can represent a first difference between: the tangential velocity of the object in a first tangential direction (e.g., the tangential azimuthal direction); and the projection of the cross product—between the radial vector of the object and the yaw velocity (e.g., the pitch velocity) of the object—onto the first tangential direction.

The autonomous vehicle can similarly calculate a first linear elevation trend line through first radial velocities versus first elevation positions of points in the first group of points; calculate a second correlation based on a second slope of the second linear trend line, which represents a relationship between a first tangential elevation velocity of the object and a first pitch velocity of the object at the first time. In particular, the second slope can represent a second difference between: the tangential velocity of the object in a second tangential direction (e.g., the tangential elevation direction); and the projection of the cross product—between the radial vector of the object and the yaw velocity of the object—onto the first tangential direction The first linear azimuthal and elevation trend lines can therefore represent a first best-fit plane for points in the first group plotted in the three-dimensional radial velocity, azimuth, and elevation space, as shown in FIG. 3A.

The autonomous vehicle can then calculate a first function that relates possible tangential azimuthal, tangential elevation, yaw, and pitch velocities of the object at the first time based on the first slope, the second slope, and the first radial vector representing the relative position of the object at the first time. More specifically, this first function can relate possible tangential azimuthal velocities of the object to possible yaw velocities of the object and relate possible tangential elevation velocities of the object to possible pitch velocities of the object at the first time.

Alternatively, the autonomous vehicle can: calculate the first best-fit plane for points in the first group directly rather than calculate the first linear azimuthal and elevation trend lines independently; and/or derive the first function based on tangential velocities in any other direction. For example, the autonomous vehicle can execute the process shown in FIG. 7 to derive a function related observations of the object (i.e., azimuthal, elevation, and range positions and radial velocities of points representing the object) and the motion state of the object in six degrees of freedom.

The autonomous vehicle can then repeat this process for subsequent scan images to generate a sequence of functions that represent possible combinations of tangential and angular motions of the object, as shown in FIG. 3A. The autonomous vehicle can then calculate an intersection of three functions—derived from three consecutive scan images—in a six-degree of freedom state space to calculate a particular or narrow range of possible radial, tangential azimuthal, tangential elevation, yaw, pitch, and roll velocities of the object.

Accordingly, the autonomous vehicle can fuse these tangential azimuthal, tangential elevation, yaw, and pitch velocities of the object with a radial velocity of the object derived from the current scan image to calculate the total velocity of the object in all six degrees of freedom relative to the autonomous vehicle, as shown in FIG. 3C.

14.3 Best-Fit Error

In this variation, the autonomous vehicle can implement methods and techniques similar to those described above to calculate a width (or "thickness") of a best-fit plane. For example, the autonomous vehicle can calculate an error for each best-fit plane for a scan image proportional to the square root of the sum of the squares of minimum distances (in three dimensions) from each point in the group to the best-fit plane. The autonomous vehicle can then calculate a thickness of this plane based on this error or otherwise represent this error in the corresponding function calculated for this object. This function can therefore represent a three-dimensional ellipsoid containing possible combinations of the tangential, yaw, and pitch velocities of the object during the scan cycle.

In this example, the autonomous vehicle can then calculate an intersection of three consecutive (thickened) functions to calculate a narrow range of possible radial, tangential azimuthal, tangential elevation, yaw, pitch, and roll velocities of the object at the current time. The autonomous vehicle can then implement methods and techniques described above to: calculate and selectively react to a future state boundary of the object based on its motion in six degrees of freedom—including: this narrow range of possible tangential azimuthal, tangential elevation, yaw, pitch, and roll velocities; the measured radial velocity of the object.

14.4 Accumulated Error

Additionally or alternatively, after calculating first, second, and third functions over three consecutive scan cycles, the autonomous vehicle can: calculate a first set of possible tangential azimuthal, tangential elevation, yaw, pitch, and roll velocities of the object represented at an intersection of the first function and the second function; calculate worst-case motion of the object that is congruent with these possible tangential azimuthal, tangential elevation, yaw, pitch, and roll velocities and the set of predefined motion limit assumptions; integrate this worst-case motion of the object over a time from the first scan cycle to the third scan cycle; and store this value as a thickness of the first best-fit plane and thus an error represented by the first function. The first function can therefore represent a three-dimensional ellipsoid containing possible combinations of the tangential, yaw, and pitch velocities of the object during the first scan cycle.

Similarly, the autonomous vehicle can: calculate a second set of possible tangential azimuthal, tangential elevation, yaw, and pitch velocities of the object represented by the second function; calculate worst-case motion of the object that is congruent with these possible tangential azimuthal, tangential elevation, yaw, and pitch velocities and the set predefined motion limit assumptions; integrate this worst-case motion of the object over a time from the second scan cycle to the third scan cycle; and store this value as a thickness of the second best-fit plane and thus an error represented by the second function. The second function can therefore represent a three-dimensional ellipsoid containing possible combinations of the tangential, yaw, and pitch velocities of the object during the second scan cycle.

In this example, the autonomous vehicle can then calculate an intersection of the (thickness, greatest-error) first function, the (thickened) second function, and the third function to calculate a narrow range of possible tangential azimuthal, tangential elevation, yaw, pitch, and roll velocities of the object at the third time, as shown in FIG. 3C. The autonomous vehicle can then implement methods and techniques described above to: calculate and selectively react to a future state boundary of the object based on its motion in six degrees of freedom—including: this narrow range of possible tangential azimuthal, tangential elevation, yaw, pitch, and roll velocities; the measured radial velocity of the object.

14.5 Multiple Sensors

As described above, in the variation of the autonomous vehicle that includes multiple offset sensors that output concurrent scan image, the autonomous vehicle can execute the foregoing methods and techniques to: calculate multiple functions representing motion of an object in six degrees of freedom from multiple concurrent scan images depicting this object; and then derive the motion of the object in six degrees of freedom based on the intersection of these functions.

For example, the autonomous vehicle can generate and fuse three functions for one object depicted in three concurrent scan images captured by three sensors on the autonomous vehicle. In another example, the autonomous vehicle can generate and fuse two consecutive pairs of two functions for one object depicted in two pairs of scan images captured by each of two sensors on the autonomous vehicle over two consecutive scan cycles.

Therefore, the autonomous vehicle can implement the foregoing Blocks of the method S100 to characterize motions of a constellation of objects based on both concurrently scan images captured during a singular scan cycle and sequences of scan images captured over multiple scan cycles.

14.6 Multiple Objects

Furthermore, the autonomous vehicle can execute multiple instances of this variation of the method concurrently to derive motion of multiple objects in six degrees of freedom from multiple concurrent or consecutive scan images captured by the autonomous vehicle.

14.7 Objects Segmentation

In one example of this variation, the autonomous vehicle captures a scan image depicting a side of a road vehicle (e.g., a passenger vehicle, a truck). The autonomous vehicle implements methods and techniques described above to group points depicting this road vehicle in the scan image based on proximity. However, if the road vehicle is moving (i.e., if its wheel speed is non-zero), the body of the road vehicle may exhibit minimal or null tangential elevation and pitch velocities relative to the autonomous vehicle, but wheels of the road vehicle may exhibit non-zero tangential elevation and pitch velocities. Therefore, radial velocities described by a first subset of points—in this group—that correspond to the body of the road vehicle may be incongruent with radial velocities described by a second subset of points—in this group—that correspond to a wheel of the road vehicle.

Therefore, in one implementation, the autonomous vehicle can distinguish and separate the first and second subgroups of points based on differences in radial velocity trends across with the group of points, as shown in FIG. 3B. For example, the autonomous vehicle can: implement methods and techniques described above to calculate an initial best-fit plane through radial velocities, azimuthal positions, and elevation positions represented by the group of points; and characterize error between (e.g., distances from) the initial best-fit plane and points in the group. If this error is high (e.g., exceeds a predefined threshold), the autonomous vehicle can: detect a first cluster of points in the group characterized by greatest error (e.g., greatest distances from the best-fit plane); segregate the group of points into a first subgroup containing the first cluster of points and a second subgroup containing the remaining points; calculate a first best-fit plane through radial velocities, azimuthal positions, and elevation positions represented by the first subgroup of points; characterize a first error between the first best-fit plane and points in the first subgroup; similarly calculate a second best-fit plane through radial velocities, azimuthal positions, and elevation positions represented by the second subgroup of points; and characterize a second error between the second best-fit plane and points in the second subgroup. The autonomous vehicle can repeat this process to iteratively refine the first and second subgroups until the error between each subgroup of points and its corresponding best-fit plane is less than a maximum error (e.g., less than the predefined threshold).

In this implementation, the autonomous vehicle can also segment the initial group of points into a maximum number of subgroups, such as a maximum of four subgroups that may collectively represent: a body and two wheels of a passenger vehicle; two wheels and front and rear body sections of an articulated bus; two wheels, a body, and a sweeper element of a street sweeper; or two wheels, a body, and a concrete mixer element of a cement truck. Additionally or alternatively, the autonomous vehicle can segment the initial group of points into subgroups, each with at least a predefined minimum quantity of points (e.g., 100 points).

More generally, differences in tangential elevation and pitch velocities of different elements of one road vehicle relative to the autonomous vehicle—which are represented in radial velocities of points in the initial group—will produce error between these points and a best-fit plane for the entire group because this best-fit plane describes congruent motion of all of these elements of the road vehicle in six degree of freedom. Therefore, the autonomous vehicle can execute the foregoing process: to detect and isolate subgroups of points that represent disparate elements on one road vehicle that exhibit different motions relative to the autonomous vehicle; and to calculate sets of functions (e.g., best-fit planes) that relate tangential azimuthal, tangential elevation, yaw, and pitch velocities of these disparate elements of the road vehicle at the time of the scan cycle.

The autonomous vehicle can then repeat this process for multiple scan images—such as a set of concurrent images captured by multiple sensors or consecutive scan images captured by one sensor—to: isolate subgroups of points representing disparate elements on the road vehicle; derive additional sets of functions that relate tangential azimuthal, tangential elevation, yaw, and pitch velocities of these elements of the road vehicle; and then derive motion of each element of the road vehicle in six degrees of freedom relative to the autonomous vehicle based on the intersection of three sets of functions for each element of the road vehicle, as described above. The autonomous vehicle can also calculate the total absolute motion of each element of the road vehicle based on these relative motions and the concurrent motion of the autonomous vehicle, as described above.

14.8 Linking Objects

Furthermore, once the autonomous vehicle thus derives relative or absolute motions of multiple elements of a road vehicle in six degrees of freedom, the autonomous vehicle can implement methods and techniques similar to those described above to regroup these disparate elements into one composite object (e.g., one "rigid body") if their linear motions are congruent, such as if their absolute or relative total linear velocities fall within the predefined velocity discrimination threshold described above.

For example, the autonomous vehicle can estimate a first linear motion of a first object and a first angular motion of the first object—relative to the autonomous vehicle—at a current time in Block S126 based on an intersection of a set of (e.g., three) functions derived from three subgroups of points representing the first object depicted in three consecutive scan images captured by the sensor. Concurrently, the autonomous vehicle can estimate a second linear motion of a second object and a second angular motion of the second object—relative to the autonomous vehicle—at the current time in Block S126 based on an intersection of a set of (e.g., three) functions derived from three subgroups of points representing the second object depicted in these three consecutive scan images. The autonomous vehicle can then identify the first object and the second object as corresponding to a common rigid body in response to alignment between the first linear motion of the first object and the second linear motion of the second object in Block S160, such as if the difference between the first and second linear motions falls within the predefined velocity discrimination threshold described above, as shown in FIG. 3B.

More specifically, two objects—detected and tracked across multiple scan cycles by the autonomous vehicle—that correspond to different elements of the same road vehicle may exhibit dissimilar pitch and yaw velocities relative to the autonomous vehicle but will move together along the same path and will therefore exhibit the same (or very similar) linear velocities. Therefore, the autonomous vehicle groups objects in close proximity and exhibiting the same (or very similar) linear velocities—and possibly different yaw and pitch velocities—to form one composite object (or one "rigid body") that represents a complete road vehicle.

14.9 Object Classification

Furthermore, the autonomous vehicle can classify a type of an individual object based on its motion characteristics.

In one example shown in FIG. 3B, the autonomous vehicle can identify an object as a wheel by: projecting points in the (sub)group that represent this object into a three-dimensional space based on the azimuthal position, elevation position, and range values contained in these points; calculating a direction of the absolute linear velocity of the object; calculating a vertical plane through the group of points and parallel to (i.e., containing) the direction of motion of the object; and calculating linear velocity components of radial velocities of points in the group within the vertical plane. The autonomous vehicle can then identify the object as a wheel in Block S162: if the maximum linear velocity—within the vertical plane—of these points (i.e., of a point representing a current top of the wheel or tire) is approximately twice the absolute linear velocity of the object (and parallel to and/or in the same orientation as the direction of the absolute linear velocity of the object); and/or if the minimum linear velocity—within the vertical plane—of these points (i.e., of a point representing a current bottom of the wheel or tire) is approximately null.

In a similar example, the autonomous vehicle can identify an object as a wheel by: calculating a direction of the absolute linear velocity of the object; and calculating linear velocity components of radial velocities of points in the group parallel to the absolute direction of motion of the object. The autonomous vehicle can then identify the object as a wheel in Block S162: if the maximum linear velocity—parallel to the absolute direction of motion of the object—of these points (i.e., of a point representing a current top of the wheel or tire) is approximately twice the absolute linear velocity of the object (and parallel to and/or in the same orientation as the direction of the absolute linear velocity of the object); if the minimum linear velocity—parallel to the absolute direction of motion of the object—of these points (i.e., of a point representing a current bottom of the wheel or tire) is approximately null; and/or if a gradient of linear velocities of points in the group parallel to the absolute direction of motion of the object increases from approximately null proximal a ground plane to approximately twice the absolute linear velocity of the object at the top of the object (e.g., at a point on the object twice the height above the ground plane of the vertical center of the group of points).

Then, in response to identifying an object—within a composite object—as a wheel, the autonomous vehicle can classify this composite object as a wheeled vehicle, as shown in FIG. 3B. More specifically, the autonomous vehicle can classify a composite object as a wheeled vehicle based on motion characteristics and/or relative positions of objects contained in the composite object—such as rather than or in addition to implementing artificial intelligence and computer vision techniques to classify the composite object based on visual characteristics of the composite object detected in a color image or geometry characteristics of the object derived from a depth image of the composite object. Therefore, by classifying a composite object as a wheeled vehicle based on motion of the objects contained therein based on simple, predefined, prescriptive rules rather than complex artificial intelligence and computer vision techniques, the autonomous vehicle can accurately classify the composite object in less time and/or with less computational load.

Furthermore, after classifying the composite object as a wheeled vehicle, the autonomous vehicle can retrieve predefined motion limit assumptions for wheeled vehicles—rather than for a generic object (i.e., for all possible object types)—and assign or label these refined predefined motion limit assumptions to the composite object, as shown in FIG. 3B. For example, the autonomous vehicle can retrieve predefined motion limit assumptions for wheeled vehicles that specify: maximum angular velocities that are less than maximum angular velocities for motorcycles and pedestrians and that vary as a function of and decreasing proportional to the ground speed of a vehicle; and maximum linear accelerations that are less than for motorcycles.

Furthermore, in this variation, the autonomous vehicle can detect hostile motion of the composite object if an object—within this composite object—identified as a wheel exhibits a maximum linear velocity in parallel to the direction of linear motion of the object that is (significantly) more than twice the total absolute linear velocity of the object, as such characteristics may indicate that the wheeled vehicle is "peeling out," "burning out," or has otherwise lost traction. Accordingly, the autonomous vehicle can retrieve predefined motion limit assumptions for wheeled vehicles exhibiting loss of traction and assign or label these refined predefined motion limit assumptions to the composite object. For example, the autonomous vehicle can retrieve predefined motion limit assumptions for wheeled vehicles exhibiting loss of traction that specify lower maximum linear velocities and greater maximum angular velocities than for wheeled vehicles with traction.

15. Direction of Uncertainty of Object Motion

Figure 4:
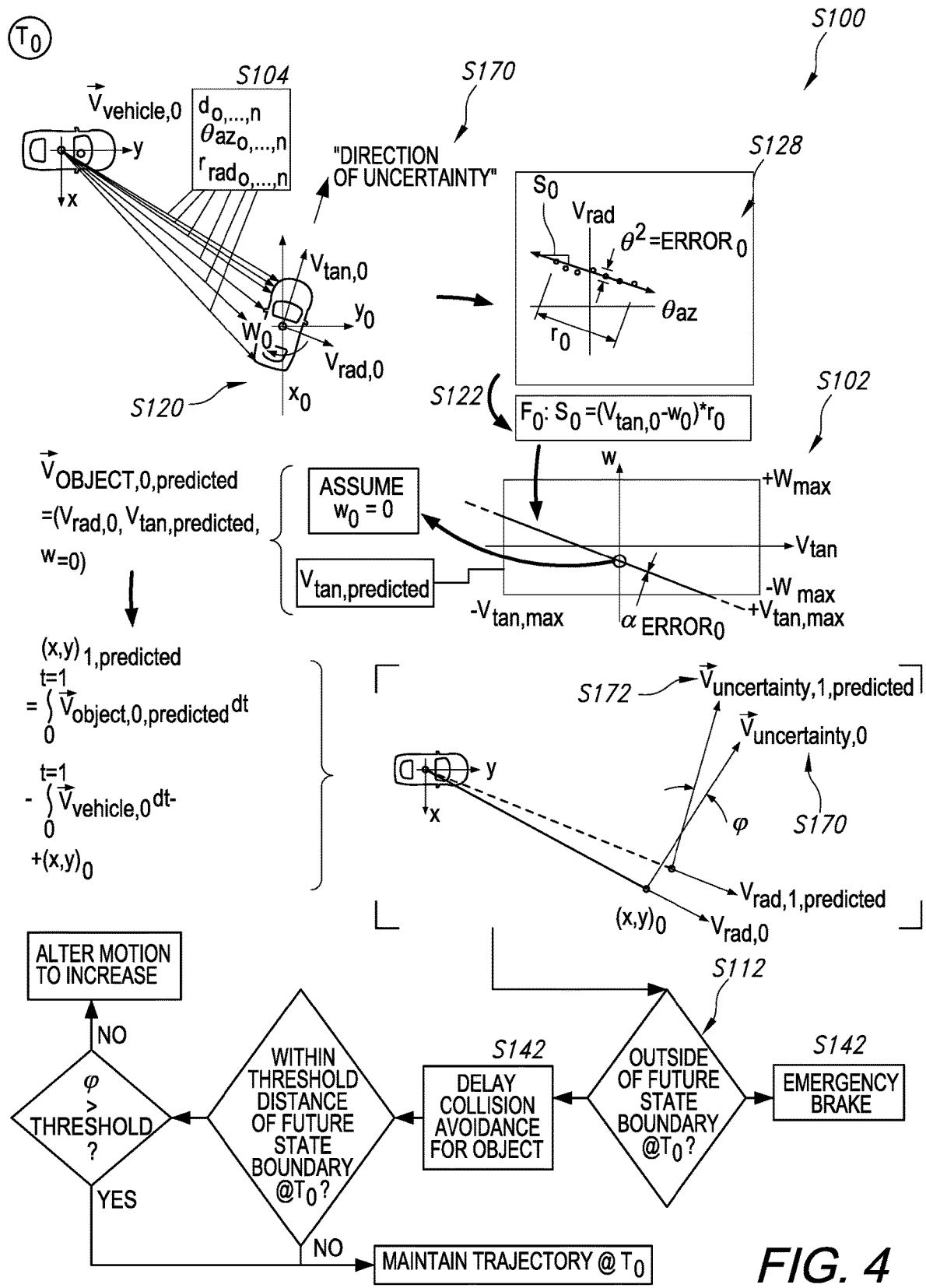
FIG. 4 is a flowchart representation of one variation of the method.

One variation of the method S100 shown in FIG. 4 includes, for a first scan cycle: accessing a first scan image containing data captured by a sensor on the autonomous vehicle at a first time in Block S104; identifying a first group of points in the first scan image representing an object in a field proximal the autonomous vehicle in Block S120, each point in the first group of points including a first position of a surface on the object relative to the autonomous vehicle and a first radial velocity of the surface of the object relative to the sensor; calculating a first radial velocity of the object, relative to the autonomous vehicle, at the first time based on a first measure of central tendency of first radial velocities of points in the first group of points in Block S122; and characterizing a first direction of uncertainty of motion of the object at the first time along a first tangential direction perpendicular to the first radial velocity of the object in Block S170. This variation of the method S100 also includes: calculating a predicted second direction of uncertainty of motion of the object at a second time succeeding the first time based on motion of the autonomous vehicle at the first time in Block S172; and, in response to the second direction of uncertainty differing from the first direction of uncertainty, muting the object from braking consideration for object avoidance by the autonomous vehicle at the second time in Block S142.

15.1 Delaying Collision Avoidance Actions Based on Future Data Quality

Generally, in the foregoing variations, the autonomous vehicle may require multiple scan cycles to derive a particular absolute or relative total motion of an object, such as two scan cycles to derive the total motion of the object in three degrees of freedom or three scan cycles to derive the total motion of the object in six degrees of freedom. Furthermore, the range of possible absolute or relative motions of the object over these scan cycles calculated by the autonomous vehicle may be high—thereby yielding less certainty of the true motion of the object—if the radial position of the object relative to the autonomous vehicle remains relatively consistent over these scan cycles; and vice versa.

Therefore, in this variation, the autonomous vehicle can: characterize a current direction of uncertainty of motion of an object (e.g., in the tangential azimuthal and/or tangential elevation directions) during a current scan cycle; predict a future direction of uncertainty of motion of the object (e.g., based on the relative motions of the autonomous vehicle and the object and predefined motion limit assumptions of generic objects) during a future (e.g., a next) scan cycle; and compare the current and predicted future directions of uncertainty of motion of the object to predict whether the autonomous vehicle will improve its certainty of the motion of the object in the future—such as if the current and future directions of uncertainty of motion of the object are not parallel—which may inform a more accurate response (e.g., braking, steering, or no action) to avoid collision with the object in the future. Accordingly, if the autonomous vehicle verifies that it is currently located outside of the future state boundary of the object as described above, the autonomous vehicle can elect to delay a response to the object during the current scan cycle because the autonomous vehicle predicts greater certainty of the motion of the object in the future.

More specifically, though the autonomous vehicle may have incomplete motion information of an object when the object first comes into the view of a sensor on the autonomous vehicle, the autonomous vehicle can elect to delay an action to avoid collision with the object (e.g., braking, change of direction) because the autonomous vehicle predicts access to more or better information in the future that will reduce uncertainty of the motion of the object. Thus, the autonomous vehicle can execute this variation of the method S100 to improve ride quality and avoid unnecessary braking and steering actions that may otherwise: yield physical and emotional discomfort for riders; and increase uncertainty of actions by the autonomous vehicle for human drivers and pedestrians nearby.

15.2 Uncertainty of Object Motion

Generally, an object first detected by the object during a current scan cycle may be moving at any combination of tangential and angular velocities that satisfies a function calculated by the autonomous vehicle during the current scan cycle and that falls within maximum tangential and angular velocity assumptions prescribed by the predefined motion limit assumptions. For example, the object may be moving very rapidly into the path of the autonomous vehicle or may be braking to avoid the autonomous vehicle, such as while the autonomous vehicle and the object both approach an intersection. The radial velocities contained in points representing this object in the current scan image approximate a singular measurement direction (e.g., due to the small angle approximately) and therefore may contain insufficient information to resolve the specific tangential and angular velocities of the object.

However, during the next scan cycle, the autonomous vehicle may access more data representing motion of the object, which the autonomous vehicle can then fuse with the motion description of the object during the preceding scan cycle (e.g., a first radial velocity and a first function that relates the tangential and angular velocities of the object) to calculate a narrow(er) range of possible tangential and angular velocity combinations for the object.

Such refinement of motion of the object with data captured during a next scan cycle may be proportional to the orthogonality of the functions relating the tangential and angular velocities of the object during the current scan cycle. In particular, if these two functions exhibit low orthogonality (i.e., high parallelism), the intersection of these two functions may be a relatively large area and may thereby inform a wide range of possible tangential and angular velocities of the object; and vice versa. More specifically, if these two functions exhibit low orthogonality, the intersection of the first function and the second function divided by the union of the first function and the second function may be relatively large, which may correspond to low certainly of the motion of the object.

15.3 Uncertainty Direction Derivation

In one implementation, the autonomous vehicle implements methods and techniques described above to: access a first scan image; detect an object—for the first time—in the first scan image; calculate a first radial velocity and a first function that relates tangential and angular velocities of the object during the first scan cycle; and calculate a first future state boundary of the object.

Then, if the autonomous vehicle is very far from the future state boundary, the autonomous vehicle can mute the object from path planning consideration. For example, the autonomous vehicle can mute the object from braking consideration for object avoidance from the current time until at least a next scan cycle if a location of the autonomous vehicle at the current time falls outside of the first future state boundary of the object by greater than a threshold distance, such as a threshold distance of 50 meters or a distance traversed within a threshold time of five seconds by the autonomous vehicle given its current speed.

Conversely, if the autonomous vehicle is inside of this future state boundary, the autonomous vehicle can automatically execute a braking action, thereby slowing the autonomous vehicle in order to move the location of the autonomous vehicle outside of the future state boundary during a future (e.g., a next) scan cycle.

However, if the autonomous vehicle is near (e.g., outside of but within the threshold distance of) the future state boundary of the object, the autonomous vehicle can execute Blocks of this variation of the method S100 to characterize the direction of uncertainty of motion of the object. If an angle between the direction of uncertainty of motion of the object and the trajectory of the autonomous vehicle is more than a threshold angle (e.g., if the object is traversing a cross-street and approaching the same intersection as the autonomous vehicle), the autonomous vehicle may currently have access to insufficient information to discern whether the object is moving very quickly toward the autonomous vehicle or on course to collide with the autonomous vehicle. However, because the current location of autonomous vehicle falls outside of the future state boundary of the autonomous vehicle, the autonomous vehicle can confirm that the object will not collide with the autonomous vehicle before the autonomous vehicle can brake to a full stop even if the autonomous vehicle delays action for at least one more scan cycle and even if the object is moving with worst-case tangential and angular velocities within the predefined motion limit assumptions. Therefore, the autonomous vehicle can withhold executing an action to avoid the object until (at least) the next scan cycle when additional motion data for the object becomes available to the autonomous vehicle.

Furthermore, if the autonomous vehicle is very close to (e.g., within two meters or 200 milliseconds of) the object and/or very close to (e.g., within ten meters or one second of) the future state boundary of the object, the autonomous vehicle can execute this variation of the method S100 to predict the next direction of uncertainty of the object. For example, the autonomous vehicle can: elect a nominal angular velocity assumption (e.g., 0 radians per second) for the object at the current time; and calculate a first tangential velocity of the object based on the first function and the nominal angular velocity. Alternatively, the autonomous vehicle can: calculate a maximum tangential velocity of the object toward the autonomous vehicle that is congruent with the set of predefined motion limit assumptions and the first function (and therefore based on radial velocities of points representing the object in the current scan image and the radial length of the object); store this maximum tangential velocity as a predicted first tangential velocity of the object; and calculate a corresponding predicted first angular velocity of the object based on the first function and the predicted first tangential velocity of the object. The autonomous vehicle can then predict the total relative motion of the object based on the first radial velocity, this predicted first tangential velocity, and predicted nominal angular velocity; calculate a next relative position of the object relative to the autonomous vehicle during a next scan cycle by integrating the total relative motion of the object over the time from the current scan cycle to the next scan cycle (e.g., the sampling interval of the sensor); and then calculate a predicted second direction of uncertainty of motion of the object—during the next scan cycle—that is perpendicular to the radial position of the object relative to the autonomous vehicle during the next scan cycle and falls within the horizontal plane. (More specifically, the autonomous vehicle can calculate the predicted second direction of uncertainty of motion of the object that falls along a predicted tangential azimuthal direction for the next scan cycle.)

Therefore, the autonomous vehicle can calculate a predicted second direction of uncertainty of motion of the object during the next scan cycle based on motion of the autonomous vehicle at the current time and the first radial, and predicted first tangential, and predicted first angular velocities of the object at the current time.

15.4 Certainty Improvement Prediction

Then, if the predicted second direction of uncertainty differs from the first direction of uncertainty for the current scan cycle, the autonomous vehicle can predict a decrease in uncertainty of motion of the object during the next scan cycle and confirm no change in motion of the autonomous vehicle. The autonomous vehicle can also characterize a magnitude of predicted improvement in certainty of motion of the object upon the next scan cycle based on (or proportional to) an angle between the first and predicted second directions of uncertainty of motion of the object.

However, if the predicted second direction of uncertainty is parallel or nearly parallel to (e.g., within 5° of) the first direction of uncertainty for the current scan cycle, the autonomous vehicle can repeat the foregoing process to recalculate the predicted second direction of uncertainty for the object given a change in motion of the autonomous vehicle between the current and next scan cycles, such as a steering angle change, a braking input, or an acceleration input (while remaining in the access zone calculated for many or all objects in the field and fulfilling predefined smooth autonomous navigation requirements). For example, the autonomous vehicle can model navigational actions by the autonomous vehicle that may produce changes in the direction of uncertainty for the object—and therefore improve certainty of the motion of the object—at the next scan cycle.

Then, if one of these navigational actions yields a predicted change in the direction of uncertainty (i.e., that increase an angle between the predicted second direction of uncertainty and the first direction of uncertainty), the autonomous vehicle can execute this navigational action to modify motion of the autonomous vehicle, relative to the object during the next scan cycle. In particular, the autonomous vehicle can execute this navigational action specifically to improve opportunity to acquire information that may better inform the true motion of the object rather than necessarily to avoid collision with the object because the autonomous vehicle has already confirmed that the autonomous vehicle has time to come to a full stop before collision with object even given worst-case motion of the object.

15.5 Flanking Object

The autonomous vehicle can additionally or alternatively execute this process to calculate a predicted second direction of uncertainty of motion of the object during the next scan cycle if the first direction of uncertainty intersects a current trajectory of the autonomous vehicle, such as within a threshold distance (e.g., 30 meters, three seconds, or the stopping duration of the autonomous vehicle) ahead of the current location of the autonomous vehicle.

However, if the predicted second direction of uncertainty of motion of the object during the next scan cycle intersects the current trajectory of the autonomous vehicle beyond this threshold distance or if the predicted second direction of uncertainty of motion of the object during the next scan cycle is approximately parallel to (e.g., with 20° of) the current trajectory of the autonomous vehicle, the autonomous vehicle may have high certainty in the motion of the object toward the autonomous vehicle.

For example, if the object and the autonomous vehicle flanking each other in two immediately-adjacent and parallel lanes, the first radial velocity of the object derived from a first scan image by autonomous vehicle may indicate motion of the object toward autonomous vehicle (i.e., a highest-risk direction) with very high certainty even though the true tangential velocity of object is unknown from this first scan image. In this example, the direction of uncertainty of motion of the object (e.g., in the direction of the tangential velocity of the object) is approximately parallel to the direction of motion of the autonomous vehicle and the object and therefore does not inform motion of the object toward the autonomous vehicle. Furthermore, the angle between the trajectory of the autonomous vehicle and the direction of uncertainty of motion of the object is approximately 0°. Accordingly, the autonomous vehicle can elect a navigational action to avoid collision with the object: based on the future state boundary of the object; and not based on the uncertainty of motion of the object because the component of motion that (predominantly) effects risk of collision with the object is known.

15.6 Future Scan Cycles

The autonomous vehicle can also execute the foregoing process to predict directions of uncertainty of motion of the object—and therefore improvement in the certainty of motion of the object—over multiple future scan cycles, such as over the subsequent ten scan cycles or over the subsequent two seconds of operation of the autonomous vehicle. Accordingly, the autonomous vehicle can elect to mute an object from object avoidance considerations over multiple subsequent scan cycles because the autonomous vehicle predicts changes in directions of uncertainty of motion of the object—and therefore improvement in the certainty of motion of the object—over these multiple subsequent scan cycles. Additionally or alternatively, the autonomous vehicle can: predict (or "model") navigational actions by the autonomous vehicle that will produce changes in directions of uncertainty of motion of the object—and therefore improvement in the certainty of motion of the object—over multiple subsequent scan cycles; and then execute such navigational actions over these scan cycles in order to improve its certainty of motion of the object.

16. Uncertainty of Object Motion

A similar variation of the method S100 shown in FIG. 5 includes, for a first scan cycle at the autonomous vehicle: accessing a first scan image containing data captured by a sensor on the autonomous vehicle at a first time in Block S104; identifying a first group of points in the first scan image representing an object in a field proximal the autonomous vehicle in Block S120; and characterizing a first motion of the object at the first time based on the first group of points in Block S126. This variation of the method S100 also includes, for a second scan cycle at the autonomous vehicle: accessing a second scan image containing data captured by the sensor at a second time succeeding the first time in Block S104; identifying a second group of points in the second scan image representing the object in Block S120; and characterizing a second motion of the object at the second time based on the second group of points and the first motion in Block S126. This variation of the method S100 further includes: characterizing a second uncertainty of the second motion of the object at the second time in Block S180; calculating a predicted third uncertainty of a third motion of the object at a third time succeeding the second time based on the second motion of the object at the second time and motion of the autonomous vehicle at the second time in Block S182; and, in response to the predicted third uncertainty falling below the second uncertainty, muting the object from braking consideration for object avoidance by the autonomous vehicle at the second time in Block S142.

Similarly, this variation of the method S100 can include, for a first scan cycle at the autonomous vehicle: accessing a first scan image containing data captured by a sensor on the autonomous vehicle at a first time in Block S104; identifying a first group of points in the first scan image representing an object in a field proximal the autonomous vehicle in Block S120; and characterizing a first motion of the object at the first time based on the first group of points in Block S126. This variation of the method S100 can also include: characterizing a first uncertainty of the first motion of the object at the second time in Block S180; calculating a predicted second uncertainty of a second motion of the object at a second time succeeding the first time based on the first motion of the object at the first time and motion of the autonomous vehicle at the first time in Block S182; and, in response to the predicted second uncertainty falling below the first uncertainty, muting the object from braking consideration for object avoidance by the autonomous vehicle at the second time in Block S142.

16.1 Uncertainty of Object Motion

Generally, in this variation, the autonomous vehicle can implement methods and techniques similar to those described above to: calculate a predicted next direction of uncertainty of motion of an object during a next scan cycle; compare the current and predicted next directions of uncertainty of motion of the object to predict a magnitude of improvement in certainty of the motion of the object in the future (e.g., proportional to orthogonality of the current and predicted next directions of uncertainty of motion of the object); and then selectively delay navigational actions to avoid the object at the current time responsive to low certainty of motion of the object if the autonomous vehicle predicts a (meaningful, significant) improvement in certainty of the motion of the object in the future, thereby reducing motion changes of the autonomous vehicle and improving ride quality for a passenger, as described above.

16.2 Uncertainty Characterization: 3DOF

More specifically, in the variation described above in which the autonomous vehicle characterizes motion of objects in three degrees of freedom, the autonomous vehicle can implement methods and techniques described above to: calculate a first function representing motion of the object based on radial velocities of points representing this object in a first scan image; calculate a first future state boundary of an object upon first detecting the object in a first scan image captured during a first scan cycle; and verify that the autonomous vehicle is currently located outside of the first future state boundary of the object. The autonomous vehicle can then implement methods and techniques described above to predict a second function representing the motion of the object during a next scan cycle. For example, the autonomous vehicle can predict an (absolute or relative) motion of the object during the second scan cycle based on: the first radial velocity and the first function describing motion of the object during the first scan cycle; predefined motion limit assumptions of generic objects; and integrated over a time difference from the first scan cycle to the next scan cycle. The autonomous vehicle can then: predict a gradient of radial velocities and azimuthal position of points representing the object in a next scan image; calculate a predicted second function representing possible tangential and angular velocities of the object during the next scan cycle based on this gradient of radial velocities across these azimuthal positions; and calculate the intersection divided by the union of the first function and the predicted second function. The autonomous vehicle can then predict information gain—and therefore improvement in certainty of motion of the object—inversely proportional to this intersection divided by the union of the first function and the predicted second function.

Therefore, in the variation described above in which the autonomous vehicle characterizes motion of objects in three degrees of freedom, the autonomous vehicle can characterize the second uncertainty of the motion of the object at the second time proportional to a ratio of an intersection of the first function and the second function to a union of the first function and the second function in Block S180.

16.2 Uncertainty Characterization: 6DOF

In the variation described above in which the autonomous vehicle characterizes motion of objects in six degrees of freedom, the autonomous vehicle can implement similar methods and techniques to characterize uncertainty of the motion of the object during a next scan cycle.

For example, the autonomous vehicle can: calculate a first function representing possible tangential, angular, and pitch motions of the object during the current (i.e., first) scan cycle; implement methods and techniques described above to predict (absolute or relative) motion of the object in six degrees of freedom during the second scan cycle; predict a first gradient of radial velocities, azimuthal positions, and elevation positions of points representing the object in a next (i.e., second) scan image; and calculate a predicted second function representing possible tangential, angular, and pitch velocities of the object during the second scan cycle based on this first gradient of radial velocities across these azimuthal and elevation positions. The autonomous vehicle can then calculate the intersection divided by the union of the first function (e.g., a three-dimensional ellipsoid) and the predicted second function (e.g., a three-dimensional ellipsoid).

The autonomous vehicle can then predict information gain—and therefore improvement in certainty of motion of the object during the second scan cycle—inversely proportional to this intersection divided by the union of the first function and the predicted second function.

Then, during the second scan cycle, the autonomous vehicle can: calculate a second function representing possible tangential, angular, and pitch motions of the object during the second scan cycle; and characterize a difference between the second function and the predicted second function. The autonomous vehicle can then: implement methods and techniques described above to predict (absolute or relative) motion of the object in six degrees of freedom during a third scan cycle based on: motions represented at the intersection of the first and second functions integrated over a time difference from the second scan cycle to the next (i.e., third) scan cycle and corrected (or "adjusted") according to the difference between the second function and the predicted second function. The autonomous vehicle can then: predict a second gradient of radial velocities, azimuthal positions, and elevation positions of points representing the object in a third scan image; and calculate a predicted third function representing possible tangential, angular, and pitch velocities of the object during the next (i.e., third) scan cycle based on this second gradient of radial velocities across these azimuthal and elevation positions. The autonomous vehicle can then calculate the intersection divided by the union of the first function, the second function, and the predicted third function.

The autonomous vehicle can thus predict information gain—and therefore improvement in certainty of motion of the object during the third scan cycle—inversely proportional to this intersection divided by the union of the first function, the second function, and the predicted third function.

16.3 Object Muting

Then, as described above, the autonomous vehicle can mute the object from braking consideration for object avoidance (or from reactive navigational actions more generally) by the autonomous vehicle at least until the next scan cycle if: the current location of the autonomous vehicle falls outside of the current future state boundary calculated for the object by greater than a threshold distance; and if the autonomous vehicle predicts improvement in uncertainty of motion of the object, such as specifically in the direction of the autonomous vehicle's current trajectory.

16.4 Action to Reduce Uncertainty

Alternatively, in this variation, the autonomous vehicle can elect a navigational action to alter its trajectory in order to capture motion data for the object that may improve (i.e., reduce) the uncertainty of motion of the object during a future scan cycle, as described above.

16.5 Future Scan Cycles

The autonomous vehicle can also execute the foregoing process to predict uncertainty of motion of the object over multiple future scan cycles, such as over the subsequent ten scan cycles or over the subsequent two seconds of operation of the autonomous vehicle. Accordingly, the autonomous vehicle can elect to mute an object from object avoidance considerations over multiple subsequent scan cycles because the autonomous vehicle predicts insufficient improvement in uncertainty of motion of the object over these multiple subsequent scan cycles. Additionally or alternatively, the autonomous vehicle can: predict (or "model") navigational actions by the autonomous vehicle that will produce improvements in uncertainty of motion of the object over multiple subsequent scan cycles; and then execute such navigational actions over these scan cycles in order to improve its certainty of motion of the object.

17. Uncertainty Boundary

Figure 6:
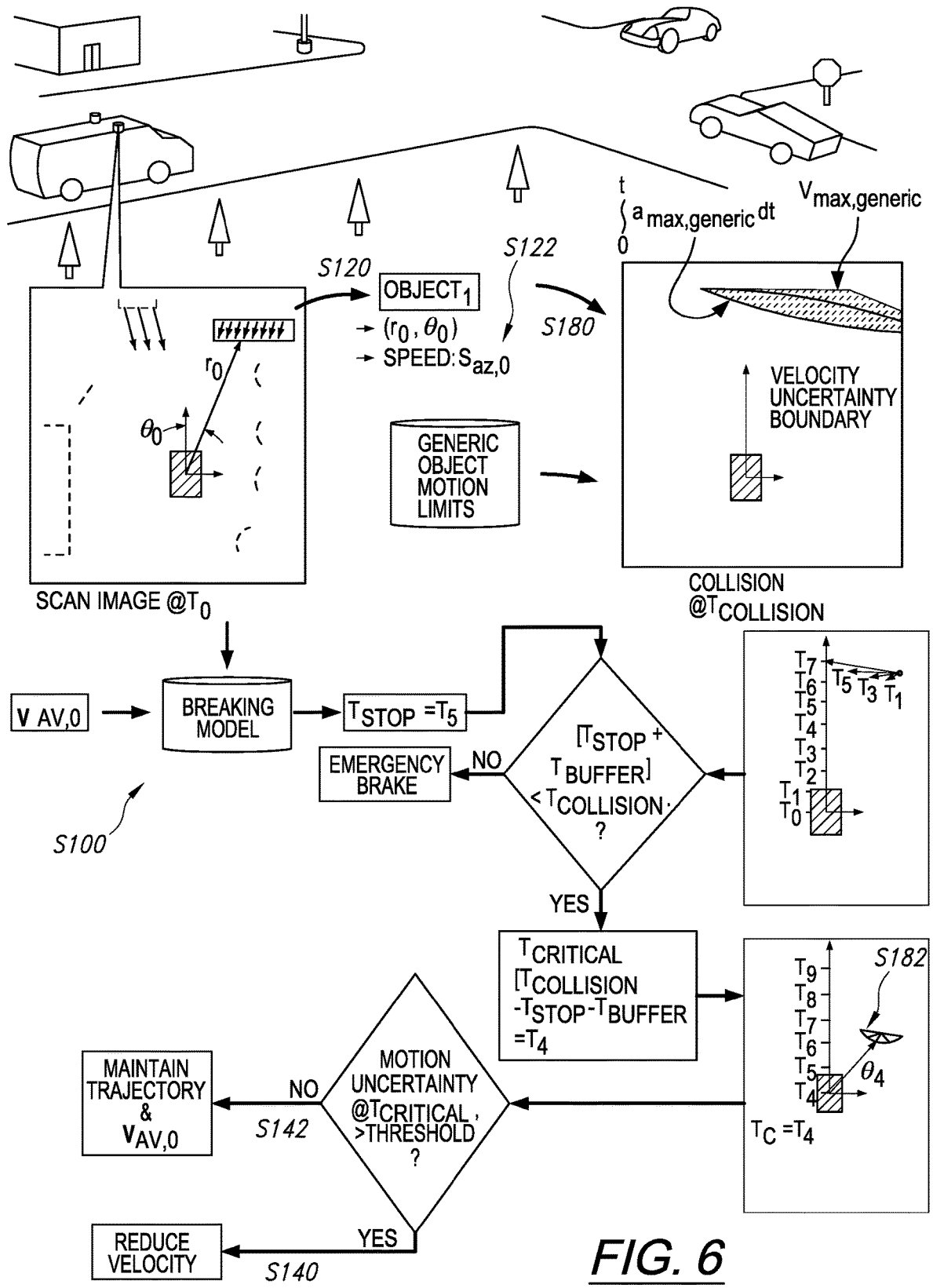
FIG. 6 is a flowchart representation of one variation of the method.

In a similar variation shown in FIG. 6, the autonomous vehicle executes Blocks of the method S100: to detect an object in a scan image (e.g., a 3D speed-annotated point cloud) of the field around the autonomous vehicle; to extract low-uncertainty motion data (e.g., a radial speed relative to the autonomous vehicle) for this object from this scan image; to identify critical motion data of the object that is currently unavailable to the autonomous vehicle but may enable the autonomous vehicle to verify worst-case object motion that may produce a future collision between the autonomous vehicle and the object; and to predict when the autonomous vehicle will access these critical motion data given the autonomous vehicle's current velocity and such worst-case motion of the object. The autonomous vehicle can then selectively delay executing collision avoidance actions (e.g., slowing, stopping) for this object responsive to predicting that the autonomous vehicle will access these critical motion data of the object at a future time that still enables the autonomous vehicle to brake to a full stop prior to colliding with this object (e.g., such that any such collision may be fully the responsibility of the object and not the responsibility of the autonomous vehicle).

For example, when the autonomous vehicle detects an object in its vicinity, the autonomous vehicle can execute Blocks of the method S100 to estimate a critical future time at which the position of the object relative to the autonomous vehicle will change sufficiently to enable the autonomous vehicle to capture additional object motion data that reduces the uncertainty of the object's motion and thus enables the autonomous vehicle to verify possibility of collision with the object. The autonomous vehicle can then confirm that, even given worst-case motion of the object (such as bounded by predefined assumptions for maximum speed of a generic object), the autonomous vehicle can still brake to a full stop prior to collision with the object if the autonomous vehicle delays an emergency stop until after this critical future time; if so, then the autonomous vehicle can delay executing a preemptive collision avoidance action for the object, which may improve predictability of the autonomous vehicle's motion for other vehicles, drivers, and pedestrians nearby and smoothing motion of the autonomous vehicle during operation. Therefore, the autonomous vehicle can delay executing a preemptive collision avoidance action for the object, which may improve predictability of the autonomous vehicle's motion for other vehicles, drivers, and pedestrians nearby and smoothing motion of the autonomous vehicle during operation.

Similarly, given worst-case motion of the object, the autonomous vehicle can calculate a maximum critical speed of the autonomous vehicle at the critical future time that enables the autonomous vehicle to brake to a full stop prior to collision with the object if the autonomous vehicle delays an emergency stop until after this critical future time. The autonomous vehicle can then: bound its maximum speed to this maximum critical speed up to the critical future if the autonomous vehicle's current speed is less than this maximum critical speed; or automatically coast or brake in order to reduce its speed to this maximum critical speed by the critical future time if the autonomous vehicle's current speed is greater than this maximum critical speed.

For example, the autonomous vehicle can: store worst-case speeds and accelerations of high-performance passenger vehicles or high-performance motorcycles (e.g., a maximum speed of 50 meters per second, a maximum acceleration of 9 meters per second per second); bound possible motion of an object in a direction not measurable by the autonomous vehicle based on these worst-case speeds and accelerations; and verify whether the object may reach and collide with the autonomous vehicle given a speed within this bound; and then execute subsequent Blocks of the method S100 to selectively delay avoidance of this object in order to collect additional motion data and to further verify motion of the object. The autonomous vehicle can therefore reduce or eliminate reliance on object identification and other machine learning techniques: to identify types of objects; to distinguish immutable objects (e.g., road signs, telephone poles) from mutable objects (e.g., pedestrian, vehicles) in the field around the autonomous vehicle; and to select dynamics models or predict future motion of objects based on their types. More specifically, rather than predict a future motion of an object based on a dynamics model selected according to a predicted type of the object, the autonomous vehicle can instead: predict and bound current and future motion of the object based on limited motion data collected during a current scan cycle, the current position of the object relative to the autonomous vehicle, and maximum speed and acceleration assumptions for a generic object (e.g., a generic high-performance passenger vehicle); and verify whether motion of this object within the bound enables the object to collide with the autonomous vehicle.

Therefore, by executing Blocks of the method S100 to inform path planning decisions, the autonomous vehicle can: reduce or eliminate a need to accurately identify types or classes of objects in its environment; reduce or eliminate this possible source of error in autonomous operation of the autonomous vehicle; and increase robustness of autonomous operation of the autonomous vehicle, such as against adversarial computer vision attacks, adversarial neural network attacks, or in circumstances with limited or no prior training data.

Furthermore, the autonomous vehicle can implement identical detection, tracking, and motion planning decision pathways for both mutable and immutable objects, thereby reducing or eliminating a need to identify classes of objects (or classifying objects as mutable or immutable) in the autonomous vehicle's environment and reducing a quantity of unique computer vision, machine learning, and path planning pipelines executing on the autonomous vehicle. For example, the autonomous vehicle can execute identical detection, tracking, and motion planning decision pathways to predict and handle: possible undetectable objects in the autonomous vehicle's environment but obscured by other detected objects (e.g., a pedestrian standing behind a telephone pole; a passenger vehicle occupying a lane obstructed in the autonomous vehicle's field of view by a tractor trailer); objects first entering the autonomous vehicle's field of view; and objects extant in the autonomous vehicle's field of view.

17.1 Object Motion Measurement Limitations and Uncertainty

Generally, the autonomous vehicle can characterize motion of an object—detected in its field—in three degrees of freedom, such as: translation in an radial direction extending from the autonomous vehicle to the object; translation in a horizontal tangential direction perpendicular to the radial direction; and rotation about a yaw axis of the object. However, points in a scan image described above may contain 1D motion observations (i.e., range rates along the radial axis) of objects in the field. As described above, the autonomous vehicle can: isolate a cluster of points represented at similar distances from the autonomous vehicle in the scan image; interpolate 2D motion (e.g., a radial speed relative to the autonomous vehicle and a yaw rate about the object) that is consistent with 1D motion observations across points in this scan image; and thus associate this cluster of points with one object in the field. Therefore, the autonomous vehicle can derive the radial speed of the object (i.e., the speed of the object along a ray extending from the autonomous vehicle through the object) and a yaw rate of the object from the scan image.

However, the scan image may contain no information related to the tangential velocity of the object (i.e., motion perpendicular to the ray extending from the autonomous vehicle to the object). Therefore, the uncertainty of the tangential velocity of the object during the current scan cycle may be relatively high in comparison to the uncertainty of the radial speed of the object directly measured by a sensor in the autonomous vehicle and stored in the current scan image.

However, if the autonomous vehicle is moving relative to the object, the autonomous vehicle's perspective of the object may change from the current scan cycle to a later scan cycle such that the object falls at a different azimuthal position in the field of view of the autonomous vehicle during this later scan cycle. The radial speed of the object thus derived from a later scan image captured by the autonomous vehicle during this later scan cycle may therefore correspond to a speed of the object in a direction—in the absolute reference system—that differs from the radial direction of the object represented in the scan image captured during the current scan cycle.

Therefore, as the autonomous vehicle and the object continue to move relative to one another over subsequent scan cycles, the autonomous vehicle can anticipate access to a set of radial speeds of the object over a range of tangential directions, can selectively elect to delay a collision avoidance action in order to access radial speeds of the object in these tangential directions and reduce uncertainty of the object's motion, and can base future path planning decisions on higher-certainty knowledge of the object's motion, thereby increasing efficiency of the autonomous vehicle and smoothing motion of the autonomous vehicle.

17.2 Velocity Uncertainty Boundary

Generally, the autonomous vehicle can implement methods and techniques described above to fuse a measured radial speed of the object and the maximum speed of a generic object—prescribed by predefined motion limit assumptions—into a velocity uncertainty boundary that represents a set of many (or all) possible velocities of the object at the current time.

For example, the autonomous vehicle can: initialize a set of vectors in a (polar) coordinate system with origin centered on the autonomous vehicle, wherein each vector represents a possible velocity of the object relative to the autonomous vehicle in the coordinate system during the current scan cycle; set a component length of each vector in the radial direction equal to the current measured radial speed of the object; assign a range of total lengths spanning a negative maximum speed of a generic object to a positive maximum speed of a generic object to the set of vectors; locate the set of vectors extending from a center of the object in the coordinate system; and calculate an ellipse or ellipsoid containing these vectors to define the velocity uncertainty boundary for the object during the current scan cycle.

In this example, the autonomous vehicle can similarly calculate a range of vectors with component lengths in the radial direction that span a range of radial speeds of points associated with the object in the current scan image and/or that span an error range radial speed measurements of the sensor that generated the scan image. The autonomous vehicle can then calculate an ellipse or ellipsoid through these vectors to define the velocity uncertainty boundary for the object during the current scan cycle.

However, the autonomous vehicle can calculate a velocity uncertainty boundary for the object in any other way.

17.3 Collision Velocity, Collision Duration, and Critical Time

Generally, the autonomous vehicle can predict a future time at which a particular velocity of the object—contained in the velocity uncertainty boundary of the object—will lead to collision with the autonomous vehicle if the autonomous vehicle continues along its current trajectory.

More specifically, the autonomous vehicle can: predict the upcoming path of the autonomous vehicle based on the autonomous vehicle's current velocity, its planned route, and/or a known lane network around the autonomous vehicle; scan the velocity uncertainty boundary of the object for a particular velocity that may enable the object to reach a particular location along the autonomous vehicle's upcoming path at approximately the same time as the autonomous vehicle, such as in light of or in spite of the known lane network; to estimate a collision time that the object moving at this particular velocity and the autonomous vehicle moving along this path will reach this particular location; and to calculate a critical time preceding the collision time by the current stopping duration of the autonomous vehicle.

17.4 Object Motion Uncertainty Prediction at Critical Time

Generally, the autonomous vehicle can: predict object motion data accessible to the autonomous vehicle between the current time and the critical time; and predict how these additional object motion data may reduce uncertainty of the object's motion.

17.4.1 Second Radial Direction at Critical Time

In one implementation, the autonomous vehicle: estimates the location of the autonomous vehicle at the critical time based on the current path and velocity of the autonomous vehicle; estimates the location of the object at the critical time based on the current location of the object and the worst-case velocity of the autonomous vehicle thus calculated during the current scan cycle; and calculates a second radial direction (or azimuth angle) from the autonomous vehicle to the object at the critical time based on these estimated locations of the autonomous vehicle and the object at the critical time. The autonomous vehicle can implement similar methods and techniques to estimate a range of radial directions from the autonomous vehicle to the object from the current time to the critical time based on the current path and velocity of the autonomous vehicle, based on the current location of the object, and assuming the worst-case velocity of the object over this period of time.

17.4.2 Future Velocity Uncertainty Boundary at Critical Time

The autonomous vehicle then: implements methods and techniques described above to calculate a future velocity uncertainty boundary of the object based on object motion data that the autonomous vehicle may collect by the critical time assuming that the autonomous vehicle and the object reach these estimated locations at the critical time.

17.4.3 Uncertainty at Critical Time

The autonomous vehicle can then characterize the uncertainty of the object's motion at the critical time, such as proportional to a range of possible speeds of the object in the tangential direction (i.e., perpendicular the radial direction) relative to the autonomous vehicle at the critical time. Then, if this predicted uncertainty of the speed of the object at the critical time falls below a threshold uncertainty (e.g., if the range of possible tangential velocities of the object is less than four meters per second), the autonomous vehicle can mute the object from a path planning decision during the current scan cycle or otherwise elect to delay any collision avoidance action responsive to the object to a future time in Block S142.

Conversely, if the predicted uncertainty of the speed of the object at the critical time exceeds this threshold uncertainty (e.g., if the range of possible tangential velocities of the object is more than four meters per second), the autonomous vehicle can reduce its speed, such as proportional to this uncertainty in order to extend the critical time further into the future, thereby enabling the autonomous vehicle to capture additional motion data for the object prior to a possible collision with the object and thus reduce the motion uncertainty of the object before this delayed critical time.

17.5 Changing Object and Points

Furthermore, because the autonomous vehicle may not rely on object classification or identification to predict a type of an object and to predict motion of the object accordingly, the autonomous vehicle may define a group of points that spans multiple real objects in the field, such as if these objects are moving along similar trajectories and at similar velocities. However, the autonomous vehicle can implement the foregoing methods and techniques to calculate, refine, and avoid a future state boundary for this "grouped object" until a time that these real objects are no longer moving along similar trajectories and/or at similar velocities, at which time the autonomous vehicle can: distinguish these objects in a current scan cycle; transfer motion characteristics from the preceding grouped objects onto each of these distinct objects; and then calculate a future state boundary for each of these objects, as described above.

Similarly, the autonomous vehicle may distinguish two clusters of points that represent a single real object and implement methods and techniques described above to calculate, refine, and avoid future state boundaries for both of these clusters, such as up until a time that the autonomous vehicle determines that proximity and self-consistency of radial speeds (or range rates) of points in these two clusters indicate a singular object.

Additionally or alternatively, the autonomous vehicle can implement the foregoing methods and techniques to calculate, refine, and avoid future state boundaries for individual points and smaller clusters of points that represent subregions of objects in the field around the autonomous vehicle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for autonomous navigation of an autonomous vehicle comprising:
  for a first scan cycle:
    accessing a first scan image containing data captured by a sensor on the autonomous vehicle at a first time;
    identifying a first group of points in the first scan image representing a first object in a field proximal the autonomous vehicle, each point in the first group of points comprising:
      a first position of a surface on the first object relative to the autonomous vehicle; and
      a first radial velocity of the surface of the first object relative to the sensor;
    calculating a first radial velocity of the first object, relative to the autonomous vehicle, at the first time based on a first measure of central tendency of first radial velocities of points in the first group of points; and
    characterizing a first direction of uncertainty of motion of the first object at the first time along a first tangential direction perpendicular to the first radial velocity of the first object;
  calculating a predicted second direction of uncertainty of motion of the first object at a second time succeeding the first time based on motion of the autonomous vehicle at the first time; and
  in response to the second direction of uncertainty differing from the first direction of uncertainty, muting the first object from braking consideration for object avoidance by the autonomous vehicle at the second time.

2. The method of claim 1:
  further comprising accessing a set of predefined motion limit assumptions for generic objects proximal public roads; and
  wherein calculating the predicted second direction of uncertainty of motion of the first object at the second time comprises:
    calculating a maximum tangential velocity of the first object, toward the autonomous vehicle, that is congruent with the set of predefined motion limit assumptions and first radial velocities of points in the first group of points; and
    calculating the predicted second direction of uncertainty of motion of the first object at the second time based on motion of the autonomous vehicle at the first time and the maximum tangential velocity of the first object at the first time.

3. The method of claim 1:
  further comprising:
    calculating a critical time offset from the first time;
    based on the first scan image, deriving a first location of the first object;
    calculating a first correlation between first radial velocities and first positions of points in the first group of points;
    based on the first correlation, calculating a first function that relates possible tangential velocities of the first object and possible angular velocities of the first object at the first time; and
    calculating a first future state boundary that represents a first ground area accessible to the first object from the first time to the critical time based on:
      the first location of the first object at the first time;
      first radial velocity of the first object;
      possible tangential velocities of the first object and possible angular velocities of the first object at the first time defined by the first function; and
      a set of predefined motion limit assumptions for generic objects proximal public roads; and
  wherein muting the first object from braking consideration for object avoidance by the autonomous vehicle at the second time comprises muting the first object from braking consideration for object avoidance by the autonomous vehicle at the second time further in response to a location of the autonomous vehicle at the first time falling outside of the first future state boundary by greater than a threshold distance.

4. The method of claim 3, wherein calculating the critical time comprises:
  estimating a stopping duration, for the autonomous vehicle to reach a full stop, based on a speed of the autonomous vehicle at the first time; and
  calculating the critical time offset from the first time by the stopping duration.

5. The method of claim 1, further comprising:
  for the first scan cycle:
    identifying a second group of points in the first scan image representing a second object in the field, each point in the second group of points comprising:
      a second position of a surface on the second object relative to the autonomous vehicle; and
      a second radial velocity of the surface of the second object relative to the sensor;
    calculating a second radial velocity of the second object, relative to the autonomous vehicle, at the first time based on a second measure of central tendency of second radial velocities of points in the second group of points; and
    characterizing a third direction of uncertainty of motion of the second object at the first time along a second tangential direction perpendicular to the second radial velocity of the second object;
  calculating a predicted fourth direction of uncertainty of motion of the second object at the second time based on motion of the autonomous vehicle at the first time; and
  in response to the predicted fourth direction of uncertainty differing from the third direction of uncertainty by less than a threshold difference, electing a navigational action to modify motion of the autonomous vehicle, relative to the second object, at the second time.

6. The method of claim 5, wherein electing the navigational action comprises identifying the navigational action that locates the autonomous vehicle at an alternate location relative to the second object at the second time to yield an alternate fourth direction of uncertainty of motion of the second object that differs from the first direction of uncertainty by greater that the threshold difference, the navigational action selected from a group of navigation actions consisting of: a braking input; an acceleration input; and a steering input.

7. The method of claim 5, wherein electing the navigational action comprises electing the navigational action further in response to the third direction of uncertainty intersecting a first trajectory of the autonomous vehicle at the first time within a threshold distance ahead of a location of the autonomous vehicle at the first time.

8. A method for autonomous navigation of an autonomous vehicle comprising:
for a first scan cycle at the autonomous vehicle:
accessing a first scan image containing data captured by a sensor on the autonomous vehicle at a first time;
identifying a first group of points in the first scan image representing a first object in a field proximal the autonomous vehicle; and
characterizing a first motion of the first object at the first time based on the first group of points;
for a second scan cycle at the autonomous vehicle:
accessing a second scan image containing data captured by the sensor at a second time succeeding the first time;
identifying a second group of points in the second scan image representing the first object; and
characterizing a second motion of the first object at the second time based on the second group of points and the first motion;
characterizing a second uncertainty of the second motion of the first object at the second time;
calculating a predicted third uncertainty of a third motion of the first object at a third time succeeding the second time based on the second motion of the first object at the second time and motion of the autonomous vehicle at the second time; and
in response to the predicted third uncertainty falling below the second uncertainty, muting the first object from braking consideration for object avoidance by the autonomous vehicle at the second time.

9. The method of claim 8:
wherein characterizing the first motion of the first object at the first time comprises:
calculating a first correlation between first radial velocities and first azimuthal positions of points in the first group of points;
based on the first correlation, calculating a first function that relates possible tangential velocities of the first object and possible angular velocities of the first object at the first time;
wherein characterizing the second motion of the first object at the second time comprises:
calculating a second correlation between second radial velocities and second azimuthal positions of points in the second group of points;
based on the second correlation, calculating a second function that relates possible tangential velocities of the first object and possible angular velocities of the first object at the second time; and
estimating a second range of tangential velocities of the first object and a second range of angular velocities of the first object, relative to the autonomous vehicle, at the second time based on an intersection of the first function and the second function; and wherein characterizing the second uncertainty of the second motion of the first object at the second time comprises characterizing the second uncertainty of the second motion of the first object at the second time proportional to a ratio of an intersection of the first function and the second function to a union of the first function and the second function.

10. The method of claim 9, wherein calculating the first correlation comprises:
calculating a first linear trend line through first radial velocities versus first azimuthal positions of points in the first group of points; and
calculating the first correlation based on a first slope of the first linear trend line, the first slope representing a relationship between a first tangential velocity of the first object and a first angular velocity of the first object at the first time.

11. The method of claim 10:
wherein calculating the second correlation comprises
calculating a second linear trend line through second radial velocities versus second azimuthal positions of points in the second group of points;
calculating the second correlation based on a second slope of the second linear trend line, the second slope representing a relationship between a second tangential velocity of the first object and a second angular velocity of the first object at the second time; and
further comprising:
characterizing a first error of the first linear trend line based on deviation of first radial velocities of points in the first group of points from the first linear trend line;
characterizing a second error of the second linear trend line based on deviation of second radial velocities of points in the second group of points from the second linear trend line;
wherein calculating the first function comprises:
calculating a first line that relates possible tangential velocities of the first object and possible angular velocities of the first object, relative to the autonomous vehicle, at the first time based on the first correlation; and
calculating a first width of the first line based on the first error; and
wherein calculating the second function comprises:
calculating a second line that relates possible tangential velocities of the first object and possible angular velocities of the first object, relative to the autonomous vehicle, at the second time based on the second correlation; and
calculating a first width of the first line based on the first error;
wherein characterizing the second uncertainty of the second motion of the first object at the second time comprises characterizing the second uncertainty of the second motion of the first object at the second time proportional to an area of an intersection of the first line, of the first width, and the second line, of the second width.

12. The method of claim 9, wherein calculating the predicted third uncertainty of the third motion of the first object at the third time comprises:
calculating a predicted third position of the first object relative to the autonomous vehicle at the third time based on the second motion of the first object at the second time and motion of the autonomous vehicle at the second time;

calculating a predicted third direction of uncertainty of motion of the first object at the third time based on the predicted third position of the first object relative to the autonomous vehicle at the third time; and
calculating the predicted third uncertainty of the third motion of the first object at the third time based on an intersection of the third direction of uncertainty and the second function.

13. The method of claim 12, wherein calculating the predicted third position of the first object relative to the autonomous vehicle at the third time comprises:
calculating a second radial velocity of the first object, relative to the autonomous vehicle, at the second time based on a first measure of central tendency of second radial velocities of points in the second group of points;
estimating a second tangential velocity of the first object, relative to the autonomous vehicle, at the second time based on a second measure of central tendency of the second range of tangential velocities; and
estimating a second angular velocity of the first object, relative to the autonomous vehicle, at the second time based on a third measure of central tendency of the second range of angular velocities; and
calculating the predicted third position of the first object relative to the autonomous vehicle at the third time based on the second radial velocity of the first object, the second tangential velocity of the first object, the second angular velocity of the first object, and motion of the autonomous vehicle at the second time.

14. The method of claim 8:
further comprising:
calculating a critical time offset from the second time;
based on the second scan image, deriving a second location of the first object; and
calculating a first future state boundary that represents a second ground area accessible to the second object from the second time to the critical time based on:
the second location of the first object at the second time;
second motion of the first object at the second time; and
a set of predefined motion limit assumptions for generic objects proximal public roads; and
wherein muting the first object from braking consideration for object avoidance by the autonomous vehicle at the third time comprises muting the first object from braking consideration for object avoidance by the autonomous vehicle at the third time further in response to a location of the autonomous vehicle at the second time falling outside of the second future state boundary by greater than a threshold distance.

15. The method of claim 14, wherein calculating the critical time comprises:
estimating a stopping duration, for the autonomous vehicle to reach a full stop, based on a speed of the autonomous vehicle at the first time; and
calculating the critical time offset from the first time by the stopping duration.

16. The method of claim 8, further comprising:
for the first scan cycle:
identifying a third group of points in the first scan image representing a second object in the field; and
characterizing a third motion of the second object at the first time based on the third group of points;
for the second scan cycle:
identifying a fourth group of points in the second scan image representing the second object in the field;
characterizing a fourth motion of the second object at the second time based on the second group of points and the third motion;
characterizing a fourth uncertainty of the fourth motion of the second object at the second time;
calculating a predicted fifth uncertainty of a fifth motion of the second object at the third time based on the fourth motion of the second object at the second time and motion of the autonomous vehicle at the second time; and
in response to the predicted fifth uncertainty differing from the fourth uncertainty by less than a threshold difference, electing a navigational action to modify motion of the autonomous vehicle, relative to the second object, at the third time.

17. The method of claim 16, wherein electing the navigational action comprises identifying the navigational action that locates the autonomous vehicle at an alternate location relative to the second object at the second time to reduce uncertainty of motion of the second object at the third time, the navigational action selected from a group of navigation actions consisting of: a braking input; an acceleration input; and a steering input.

18. The method of claim 16, wherein electing the navigational action comprises electing the navigational action further in response to the fourth motion of the second object at the second time intersecting a second trajectory of the autonomous vehicle at the second time.

19. A method for autonomous navigation of an autonomous vehicle comprising:
for a first scan cycle at the autonomous vehicle:
accessing a first scan image containing data captured by a sensor on the autonomous vehicle at a first time;
identifying a first group of points in the first scan image representing a first object in a field proximal the autonomous vehicle; and
characterizing a first motion of the first object at the first time based on the first group of points;
characterizing a first uncertainty of the first motion of the first object at the first time;
calculating a predicted second uncertainty of a second motion of the first object at a second time succeeding the first time based on the first motion of the first object at the first time and motion of the autonomous vehicle at the first time; and
in response to the predicted second uncertainty falling below the first uncertainty, muting the first object from braking consideration for object avoidance by the autonomous vehicle at the second time.

20. The method of claim 19, further comprising:
for a second scan cycle succeeding the first scan cycle:
accessing a second scan image containing data captured by the sensor at a second time;
identifying a second group of points in the second scan image representing the first object; and
characterizing a second motion of the second object at the second time based on the second group of points and the first motion of the second object at the first time;
characterizing a second uncertainty of the second motion of the first object at the second time; and
in response to the second uncertainty exceeding the predicted second uncertainty, electing a navigational action to modify motion of the autonomous vehicle, relative to the second object, at a third time succeeding the second time.

* * * * *